US012051149B2

(12) United States Patent
Spencer et al.

(10) Patent No.: US 12,051,149 B2
(45) Date of Patent: Jul. 30, 2024

(54) DISPLAY OF THREE-DIMENSIONAL SCENES WITH CHANGING PERSPECTIVES

(71) Applicant: d3Labs Inc., Moultonborough, NH (US)

(72) Inventors: Barry Spencer, Moultonborough, NH (US); Julian George Spencer, Moultonborough, NH (US); Jeremy Egenberger, Pioneertown, CA (US)

(73) Assignee: d3Labs Inc., Moultonborough, NH (US)

( * ) Notice: Subject to any disclaimer, the term of this patent is extended or adjusted under 35 U.S.C. 154(b) by 0 days.

(21) Appl. No.: 18/478,795

(22) Filed: Sep. 29, 2023

(65) Prior Publication Data

US 2024/0112396 A1    Apr. 4, 2024

Related U.S. Application Data

(60) Provisional application No. 63/412,798, filed on Oct. 3, 2022.

(51) Int. Cl.
*G06T 15/20* (2011.01)
*G06F 3/01* (2006.01)
*G06T 7/50* (2017.01)
*G06T 7/73* (2017.01)

(52) U.S. Cl.
CPC .............. *G06T 15/20* (2013.01); *G06F 3/011* (2013.01); *G06T 7/50* (2017.01); *G06T 7/73* (2017.01); *G06T 2200/24* (2013.01); *G06T 2207/10028* (2013.01); *G06T 2207/30196* (2013.01); *G06T 2210/21* (2013.01)

(58) Field of Classification Search
CPC .. G06T 15/20; G06T 7/50; G06T 7/73; G06T 2207/10058; G06T 2200/24; G06T 2210/21; G06T 2207/30196; G06F 3/011
See application file for complete search history.

(56) References Cited

U.S. PATENT DOCUMENTS

| | | |
|---|---|---|
| 2017/0318283 A1 | 11/2017 | Watson et al. |
| 2019/0045167 A1 | 2/2019 | Nestares et al. |
| 2020/0043186 A1* | 2/2020 | Selviah ..................... G06T 7/33 |
| 2020/0319472 A1* | 10/2020 | Kondo ................. G06T 19/006 |
| 2020/0368616 A1 | 11/2020 | Delamont |
| 2023/0308631 A1* | 9/2023 | Price ...................... B60K 35/10 |

* cited by examiner

*Primary Examiner* — Hang Lin

(74) *Attorney, Agent, or Firm* — Carr & Ferrell LLP

(57) ABSTRACT

Preferred embodiments are directed to systems and methods for generating a three-dimensional scene based on a user's perspective by mapping a three-dimensional space, including demarcating an axis at its origin at a surface of a display device, one side of the axis being mapped onto a physical space; receiving point cloud data from the physical space, the point cloud data indicating positions of objects in the physical space; determining the position of captured data points; computing a likely shape for each of the objects based on the captured data points; comparing the likely shape of the target objects to pre-defined parameters with pre-set values; assigning the values of the pre-defined parameters to the target objects; calculating a frustum based on the designated objects; and displaying a perspective of a three-dimensional virtual scene, the perspective being determined from the calculated frustum.

20 Claims, 22 Drawing Sheets

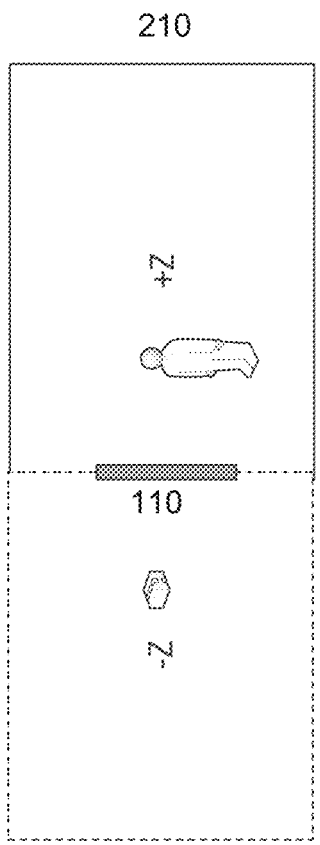
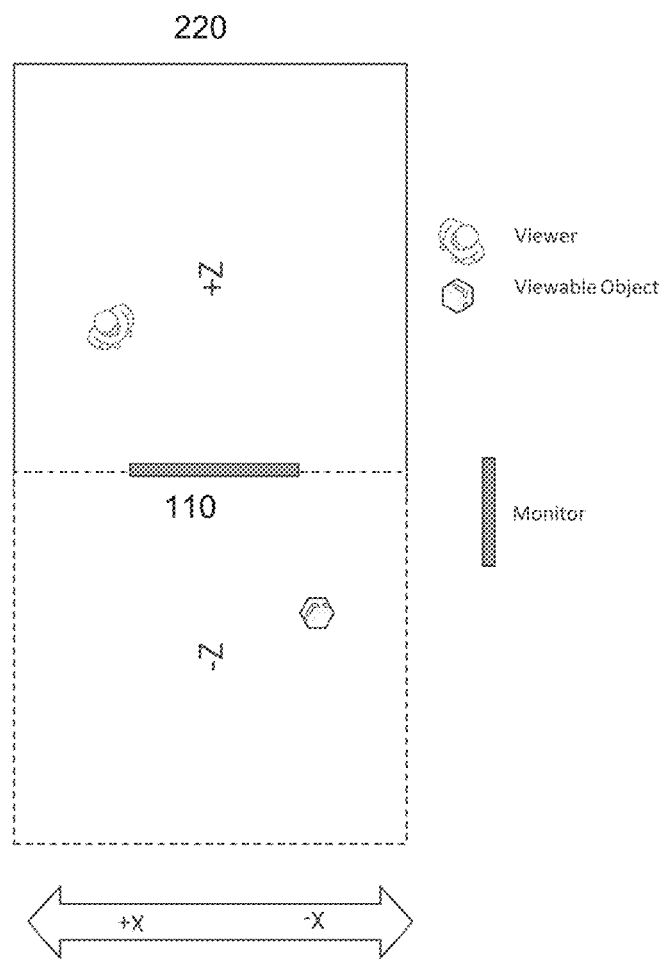
FIG. 2

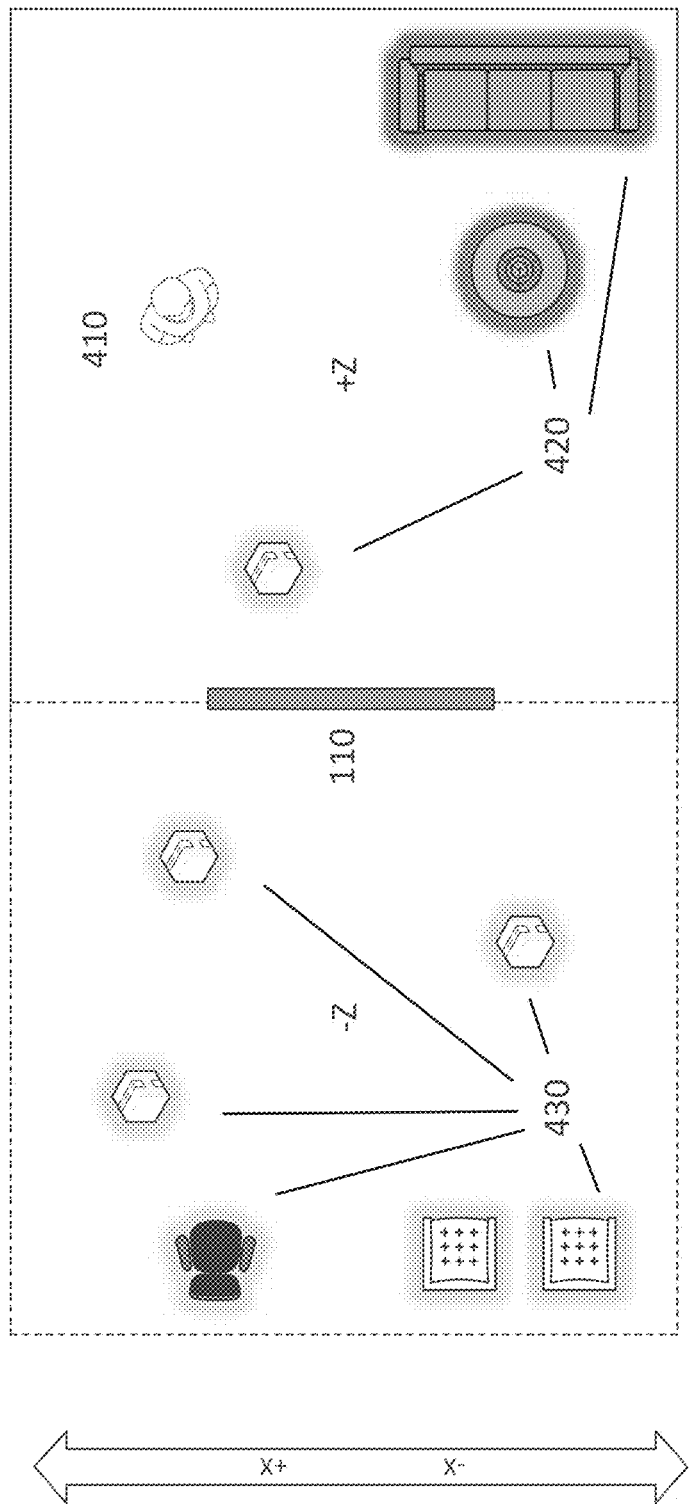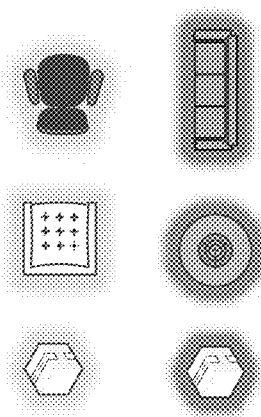
FIG. 4

DISPLAY OF THREE-DIMENSIONAL SCENES WITH CHANGING PERSPECTIVES

CROSS-REFERENCE TO RELATED APPLICATIONS

The present application claims the priority benefit of U.S. Provisional Patent Application Ser. No. 63/412,798, filed on Oct. 3, 2022, titled "Display of Three-Dimensional Scenes with Changing Perspectives". This application is related to U.S. Provisional Patent Application Ser. No. 63/536,007, filed on Aug. 31, 2023, titled "Systems and Methods for Interactive Viewing of Three-Dimensional Content Using Anatomical Tracking". These applications are hereby incorporated by reference in their entireties, including all appendices.

FIELD OF INVENTION

The present technology pertains to systems and methods for sensing, analyzing, and computing user positions and actions and generating and displaying three-dimensional scenes that accordingly change, react to, and interact with a user. In particular, but not by way of limitation, the present technology provides for the display of three-dimensional scenes with changing perspectives.

SUMMARY

In some embodiments the present technology is directed to a method for generating a three-dimensional scene based on a user's perspective, the method comprising: mapping a three-dimensional space, whereby one axis of the three-dimensional space is demarcated at its origin at a surface of a screen of a display device, the positive coordinates of the one axis are mapped onto physical space inhabited by a user; receiving captured image data containing one or more objects from one or more sensor devices; determining the coordinate position of a plurality of captured data points on the one or more objects on the three-dimensional space; computing a likely shape for each of the one or more objects based on the coordinate position of the plurality of captured data points; comparing the likely shape of the one or more objects to pre-defined parameters with pre-set values; assigning the values of one or more pre-defined parameters to at least one of the one or more objects, wherein the assigning of the values designates at least one of the one or more objects as a particular body part of the user; calculating a frustum based on at least one of the designated one or more objects; and displaying a perspective of a three-dimensional scene based on the calculated frustum.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
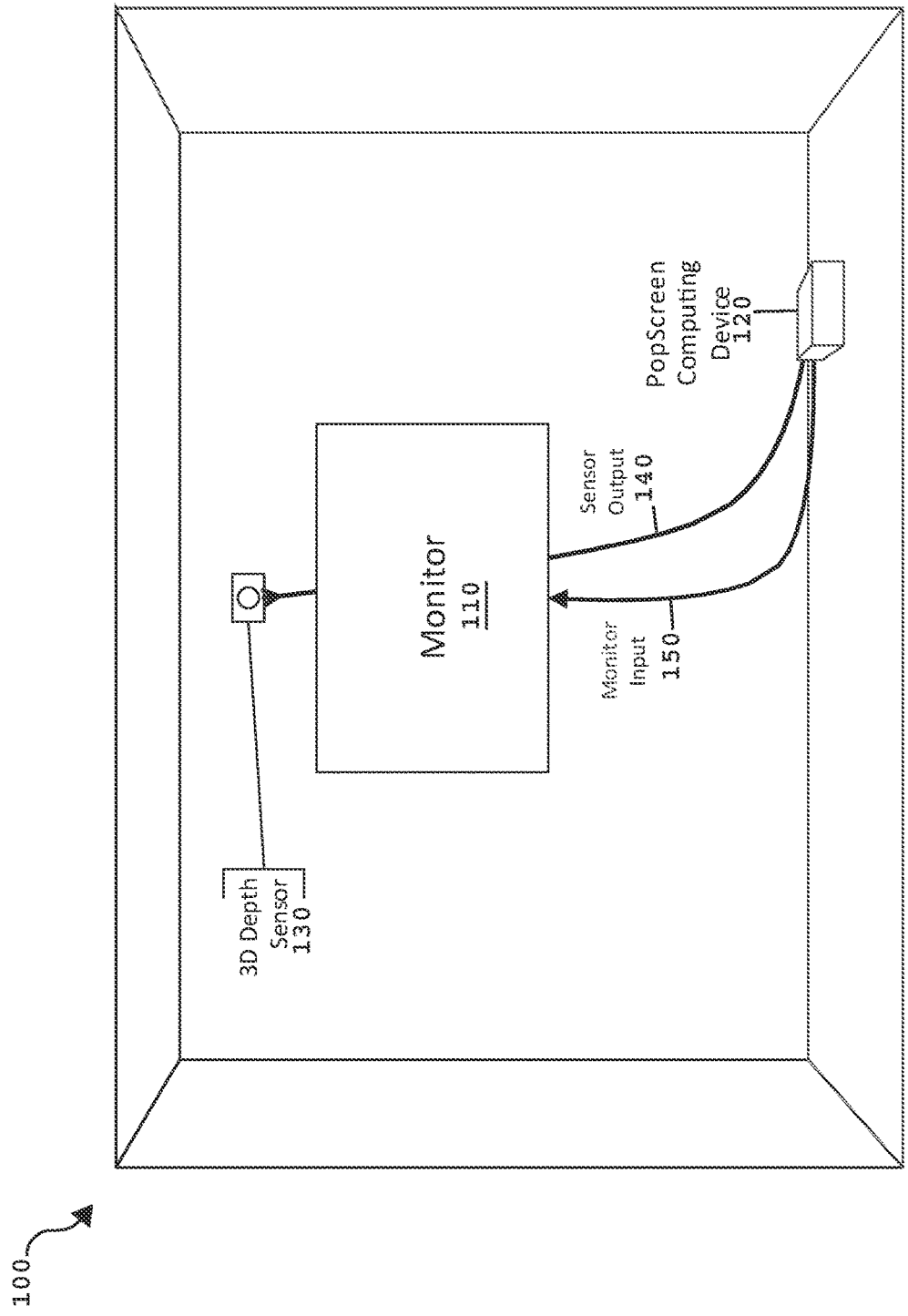

The systems and methods disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 presents one embodiment of the system described in this document.

FIG. 2 presents various views of the coordinate space utilized by the systems and methods described herein (referred to as "PopScreen solution").

Figure 3:
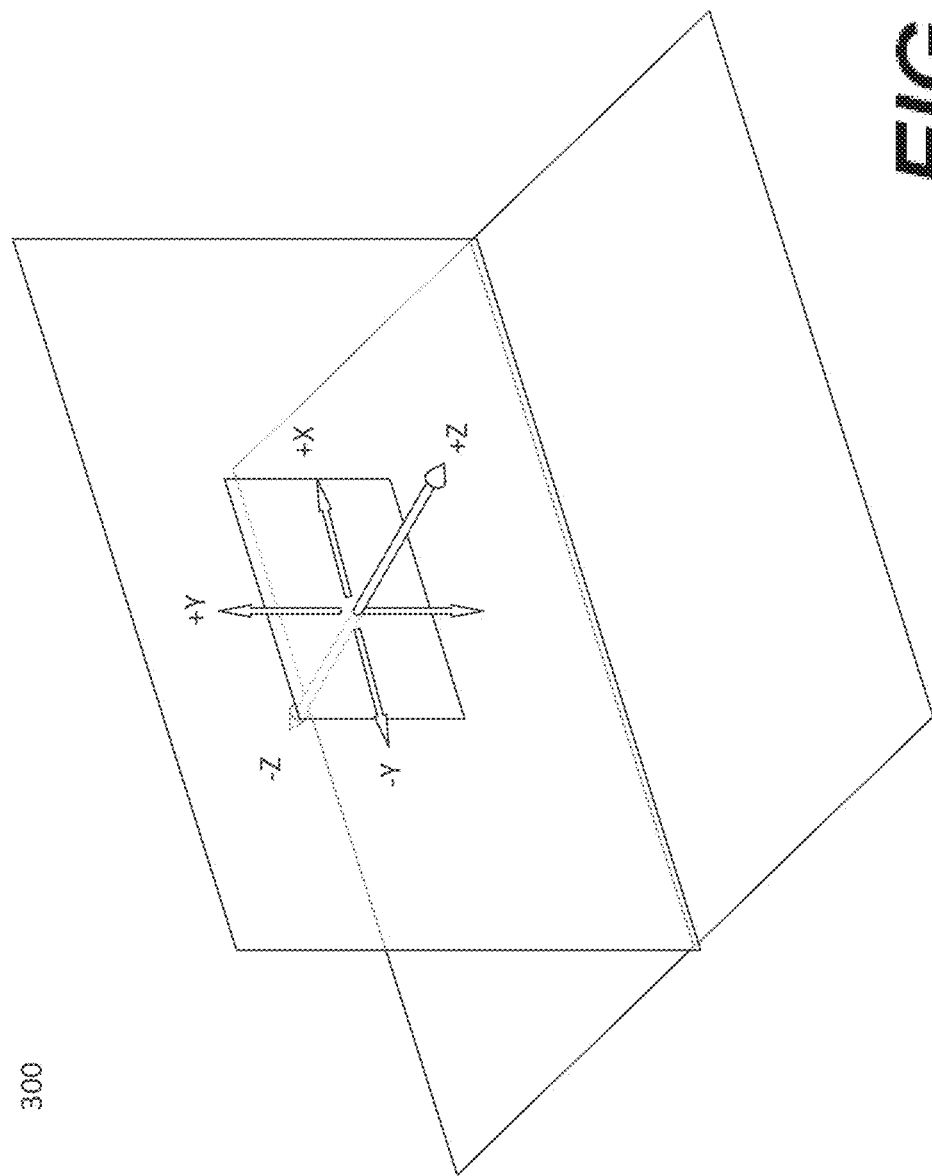

FIG. 3 presents a perspective view of the coordinate space utilized by the PopScreen solution.

FIG. 4 presents a top view of one embodiment of a user along with both physical and virtual objects in the coordinate space utilized by the PopScreen solution.

Figure 5:
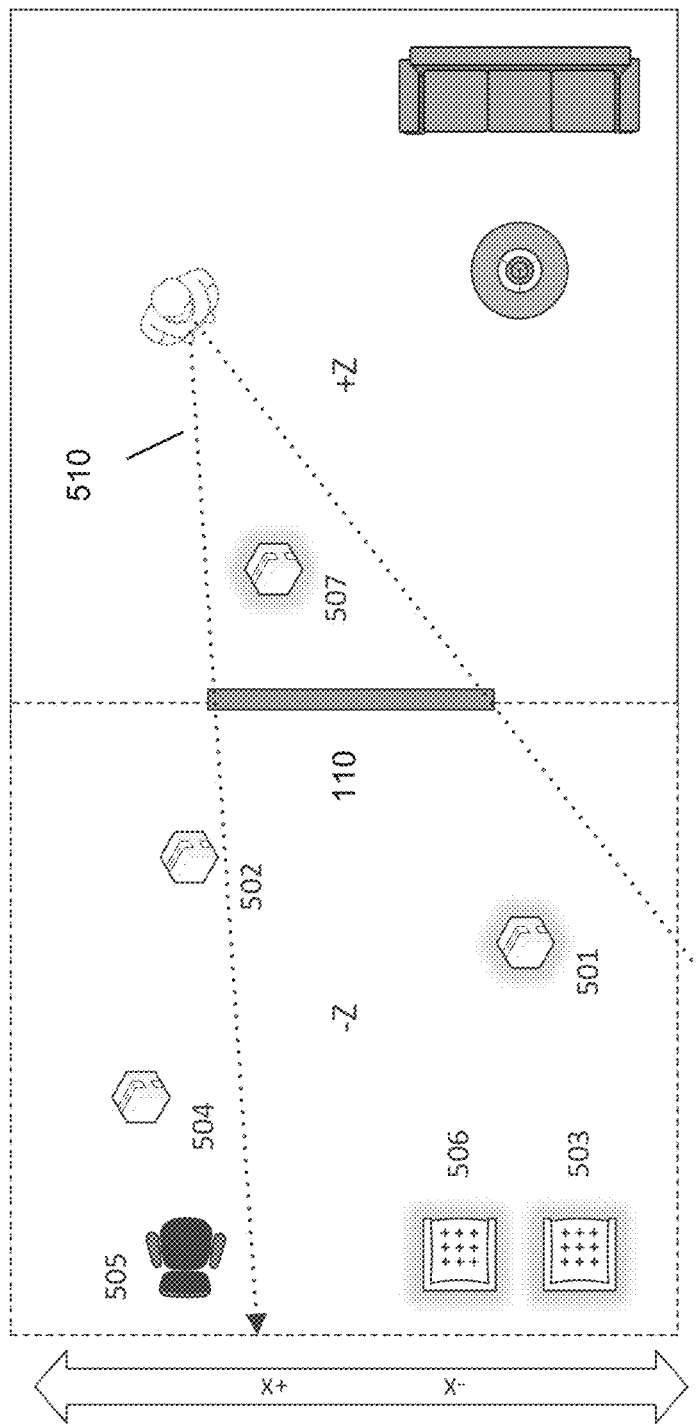

FIG. 5 presents a top view of one embodiment of the systems and methods described where the user's field of vision determines what is displayed by the PopScreen solution.

Figure 6:
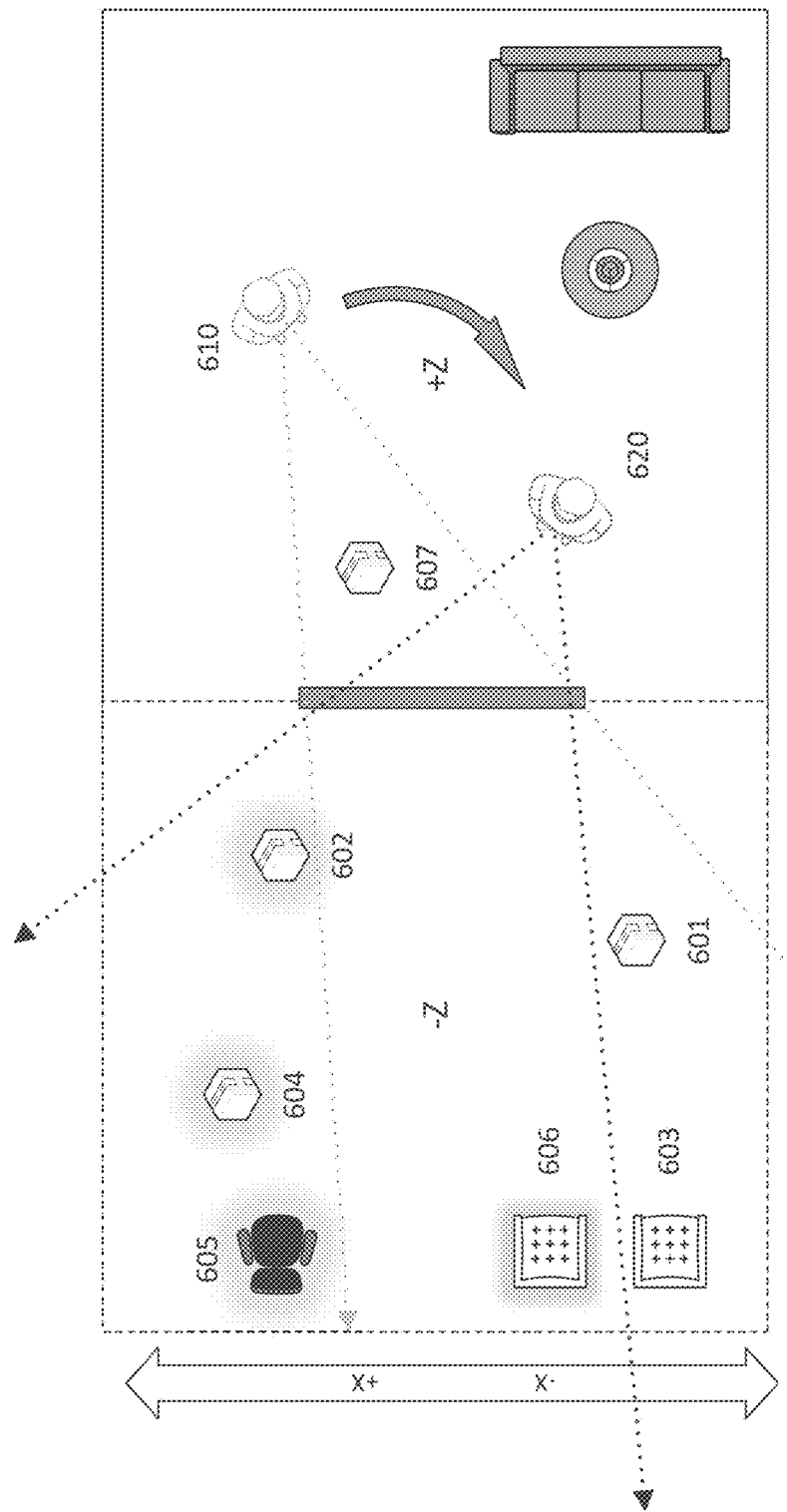

FIG. 6 presents a top view of one embodiment of the PopScreen solution where the changes in the user's position changes what is displayed by the system.

Figure 7:
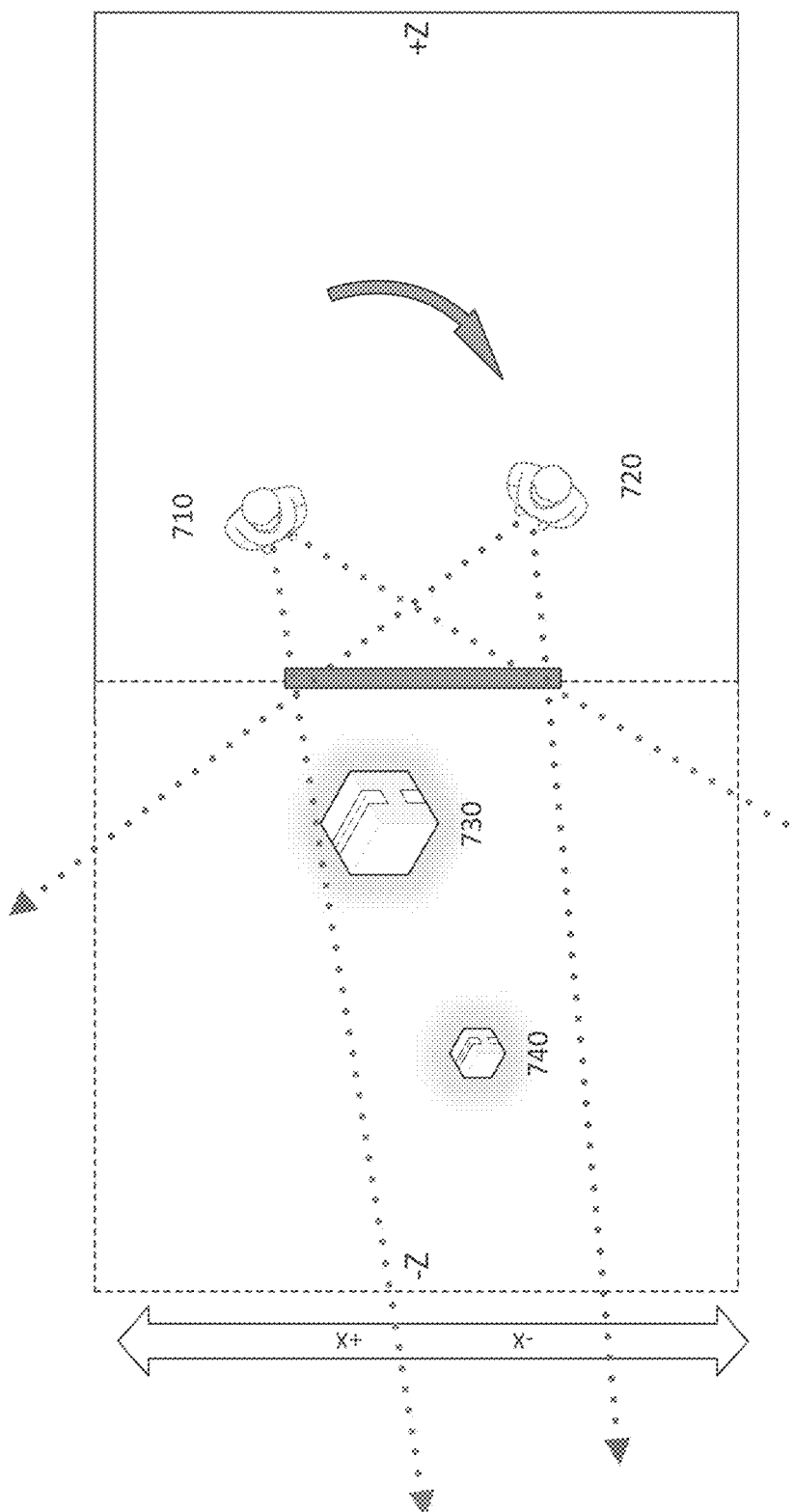

FIG. 7 presents an embodiment of the PopScreen solution where change in the user's positions reveals hidden objects.

Figure 8:
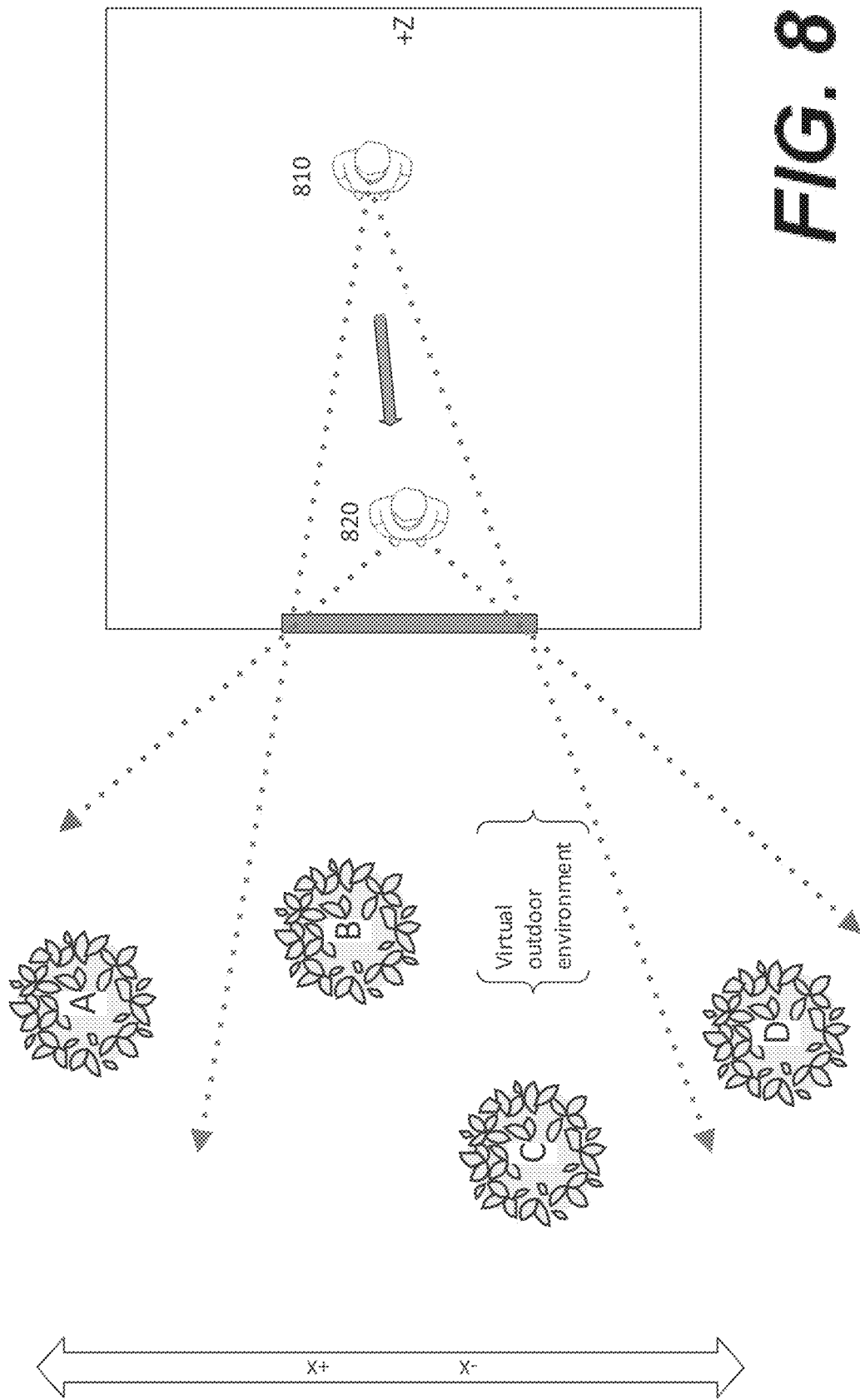

FIG. 8 presents an embodiment of the PopScreen solution where change in the user's position expands the user's field of view.

Figure 9:
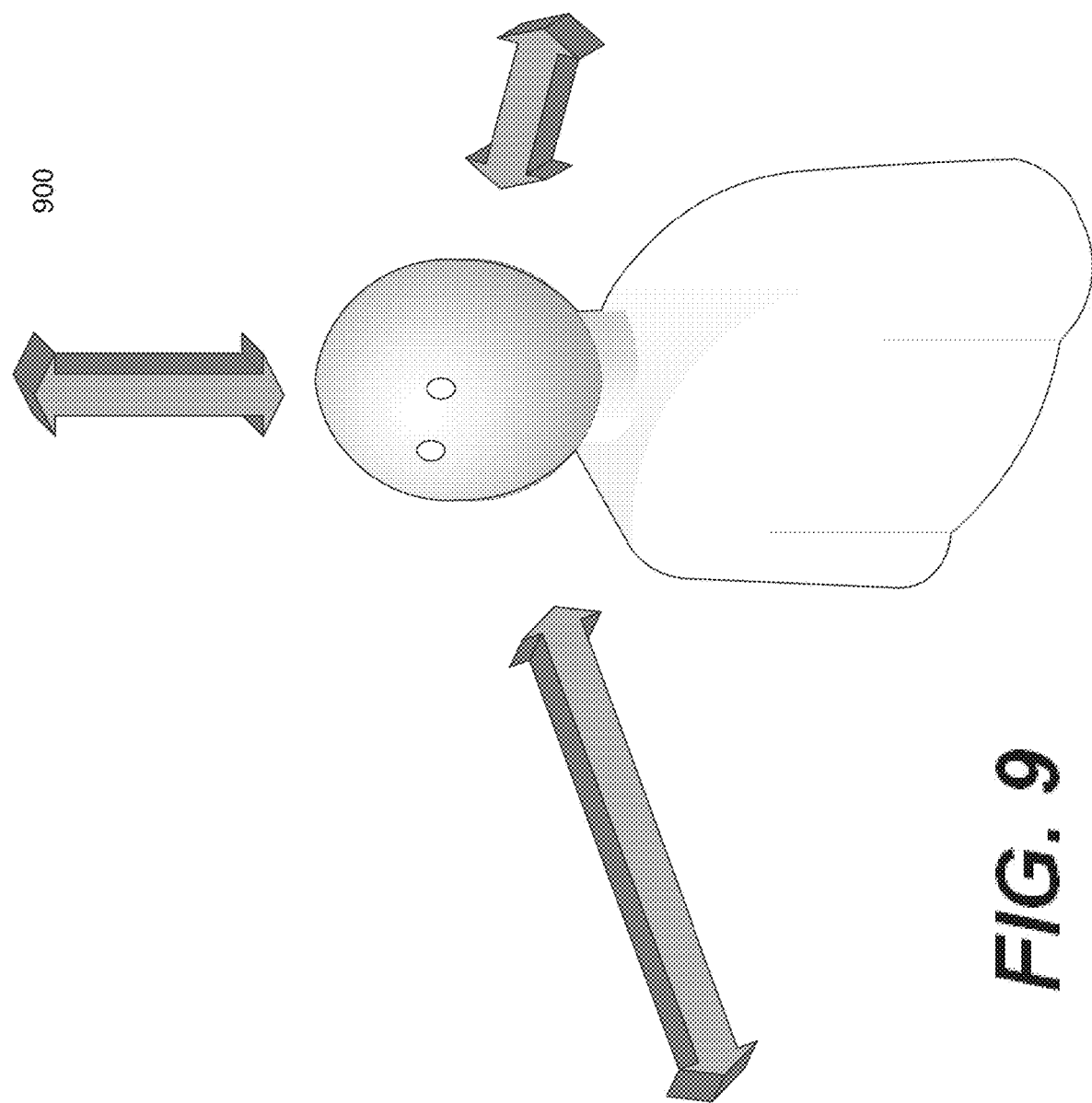

FIG. 9 presents a diagram of a user in three-dimensional space.

Figure 10:
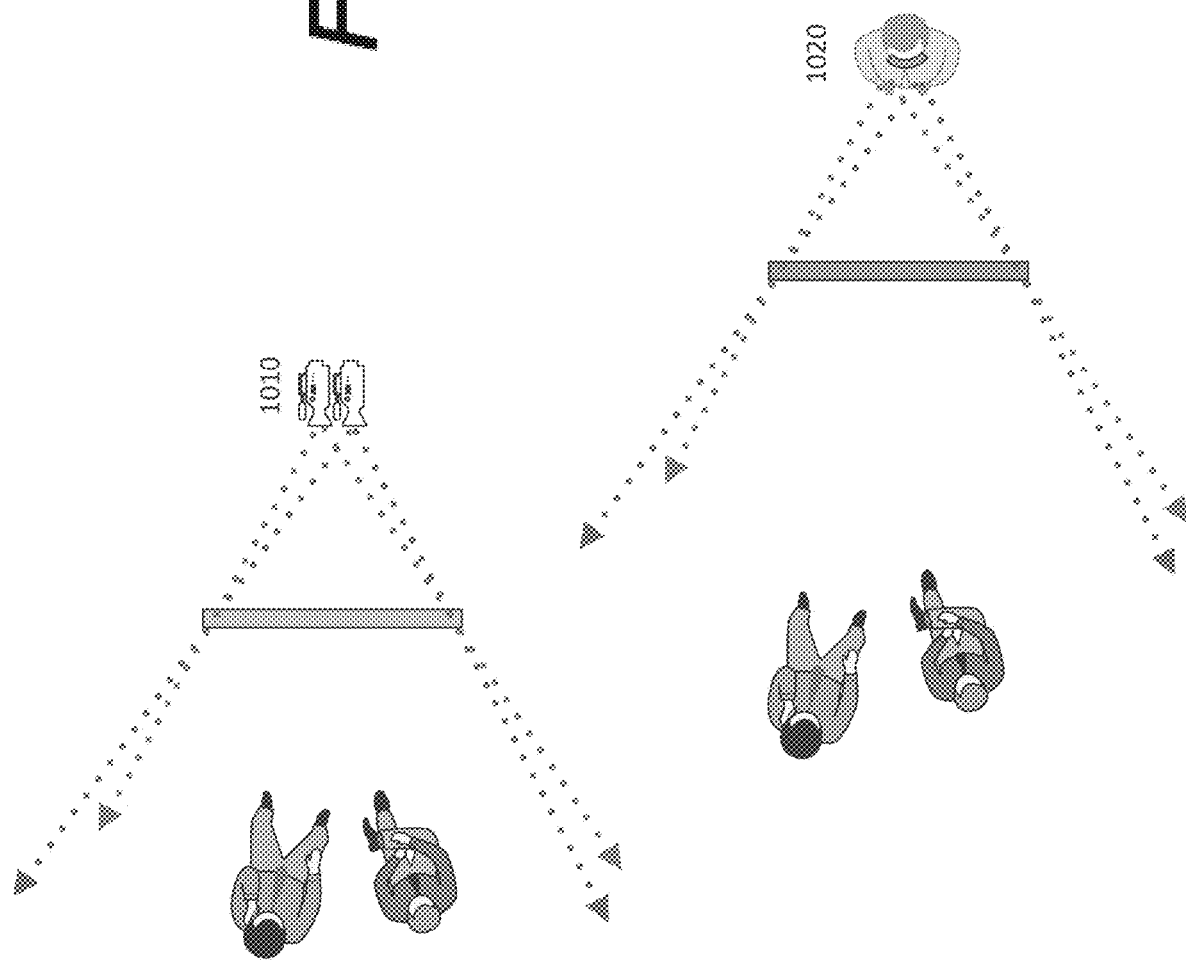

FIG. 10 presents a diagram of traditional stereoscopic viewing.

Figure 11:
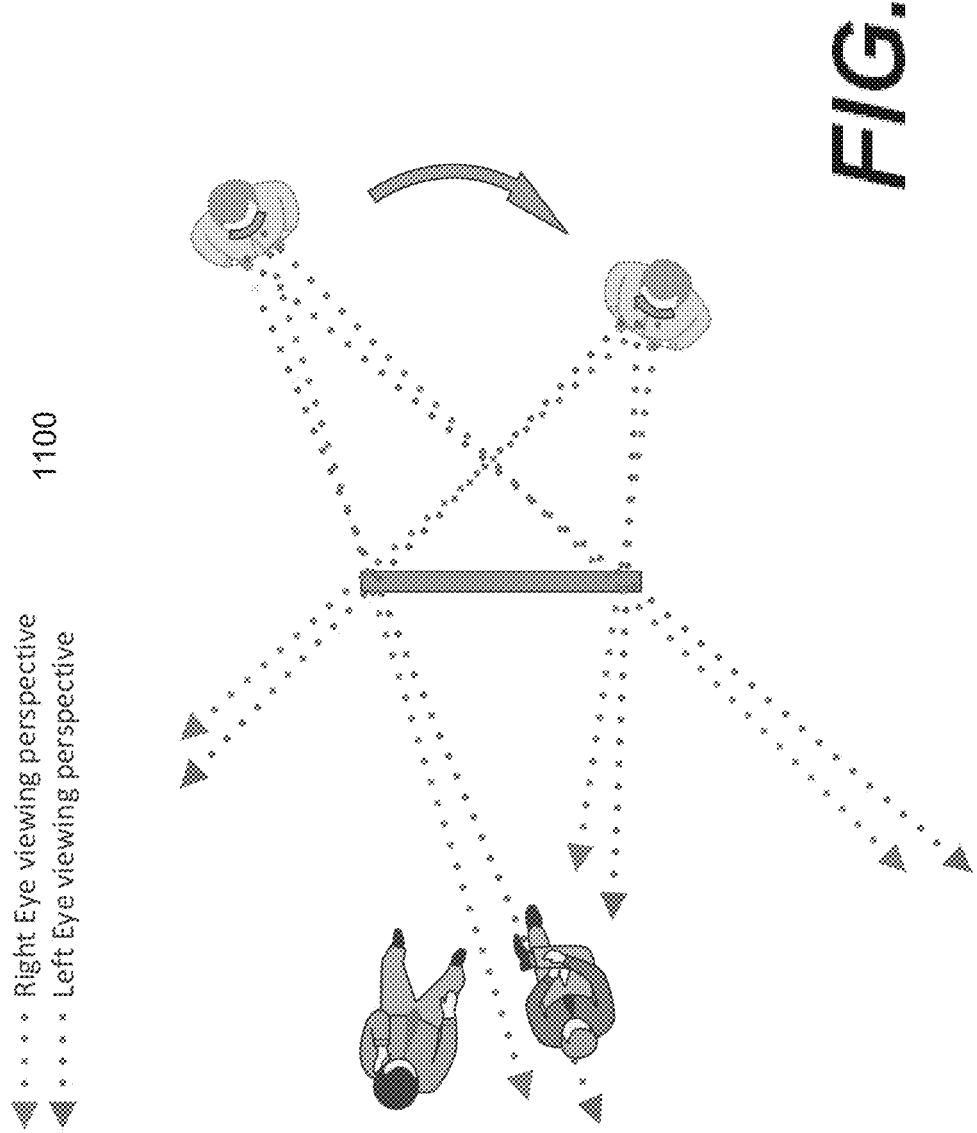

FIG. 11 presents a diagram comparing traditional stereoscopic viewing to the PopScreen solution.

Figure 12:
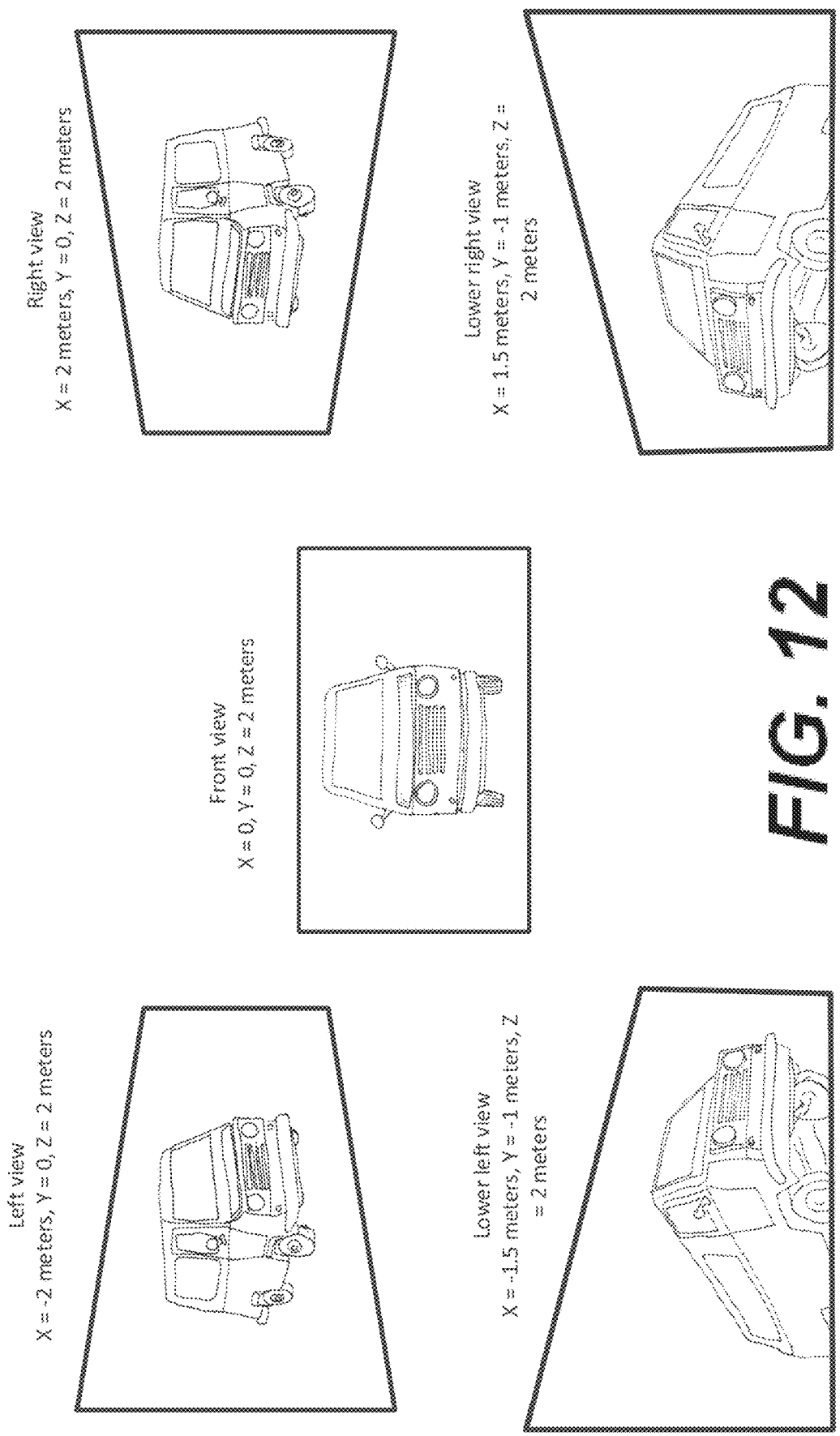

FIG. 12 presents a diagram of different possible perspectives displayed by the PopScreen solution from different viewing angles.

Figure 13:
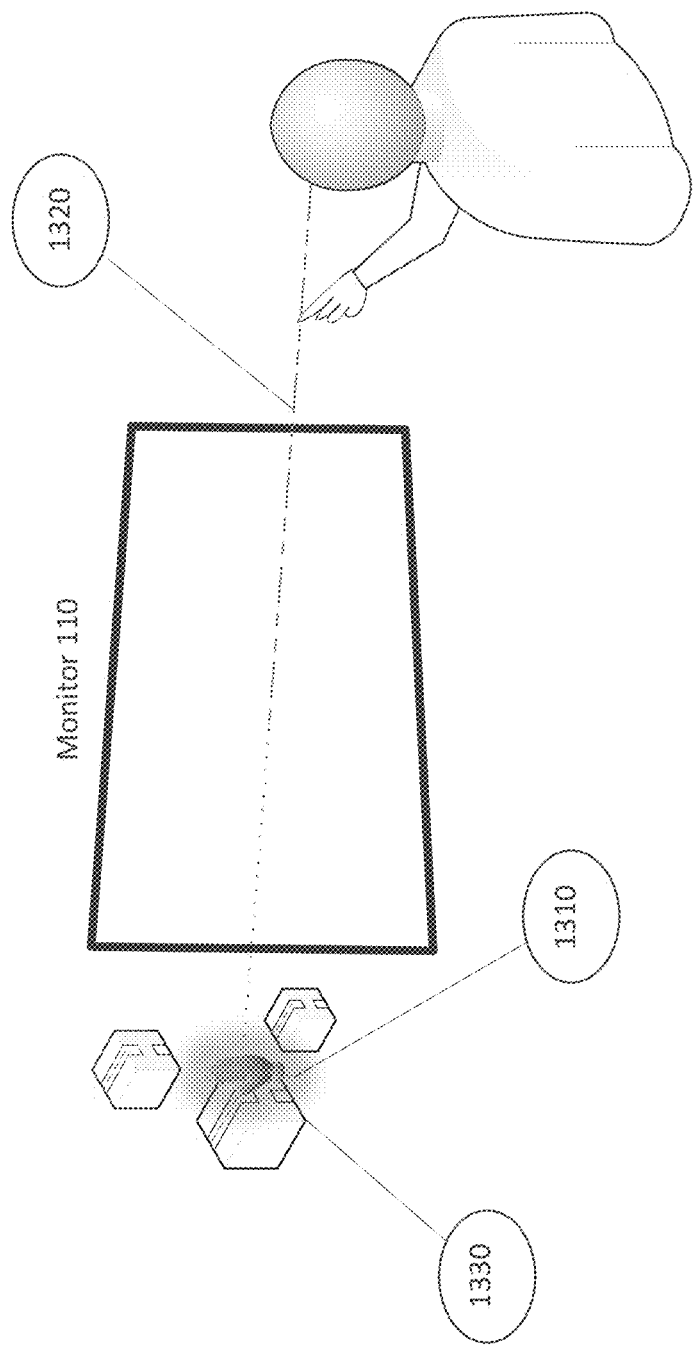

FIG. 13 presents a diagram of one embodiment of a user using the PopScreen Solution's 3D cursor.

Figure 14:
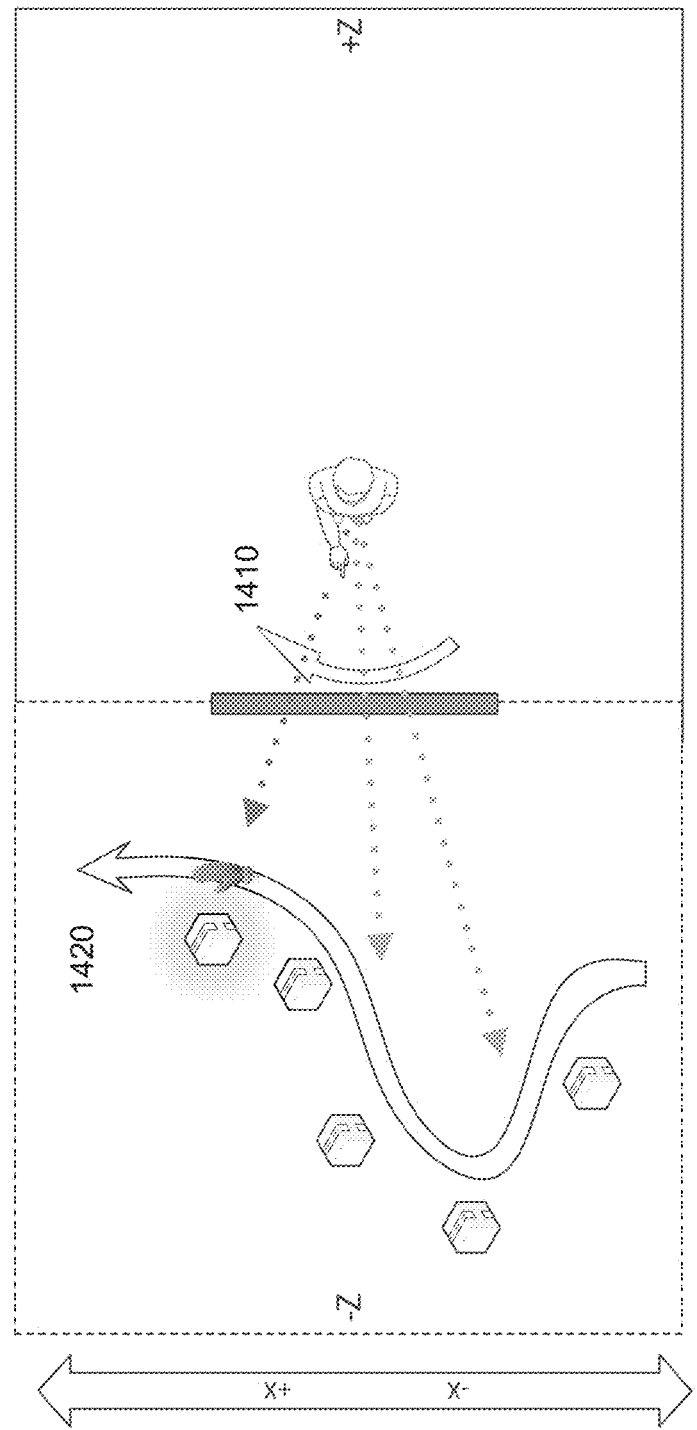

FIG. 14 presents a top view of one embodiment of the movement and use of the PopScreen Solution's 3D cursor.

Figure 15:
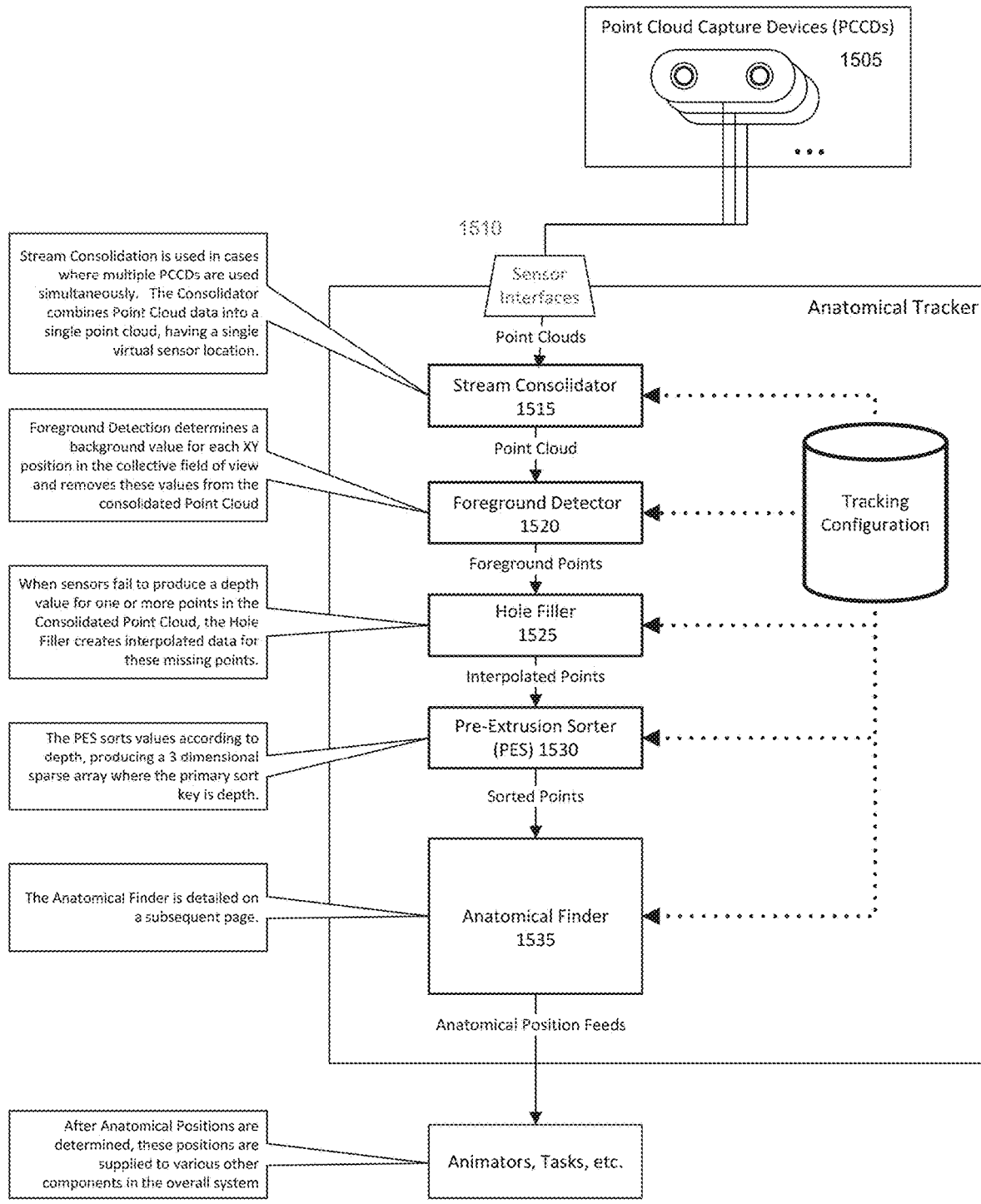

FIG. 15 diagrammatically illustrates an overview of an exemplary method for anatomical tracking.

Figure 16:
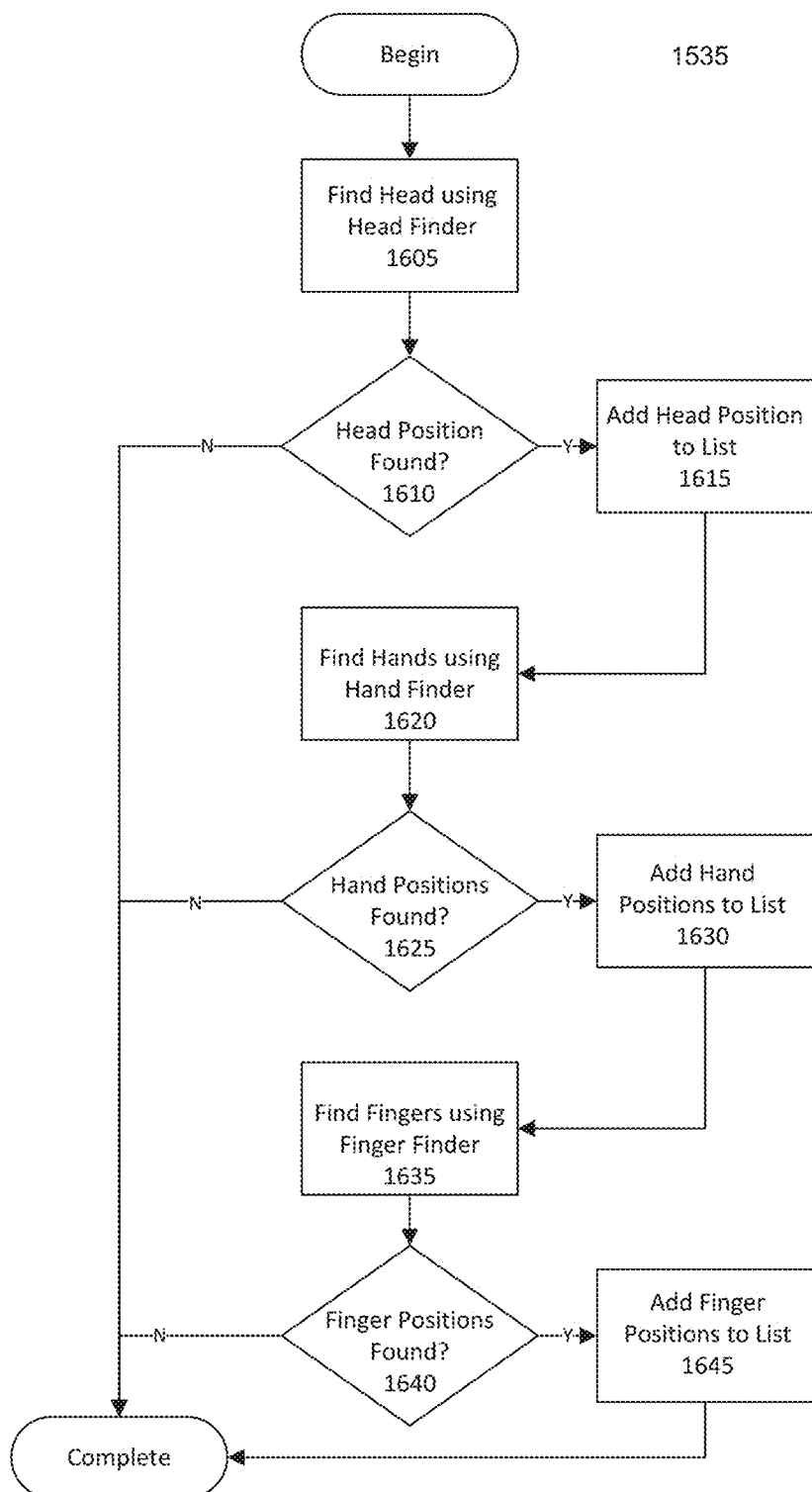

FIG. 16 diagrammatically illustrates an exemplary method implemented by an anatomical finder.

Figure 17:
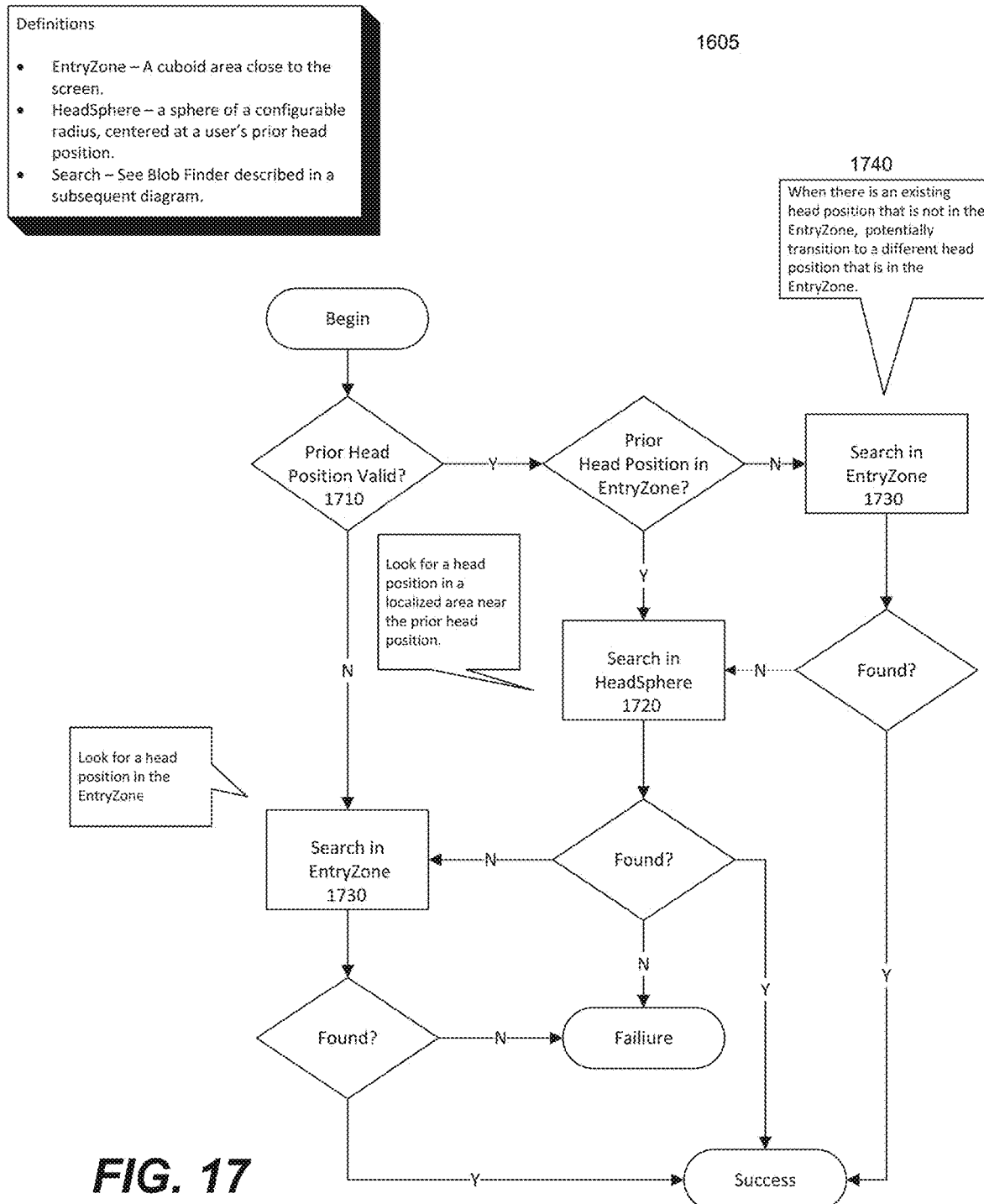

FIG. 17 diagrammatically illustrates an exemplary embodiment of a head finder.

Figure 18:
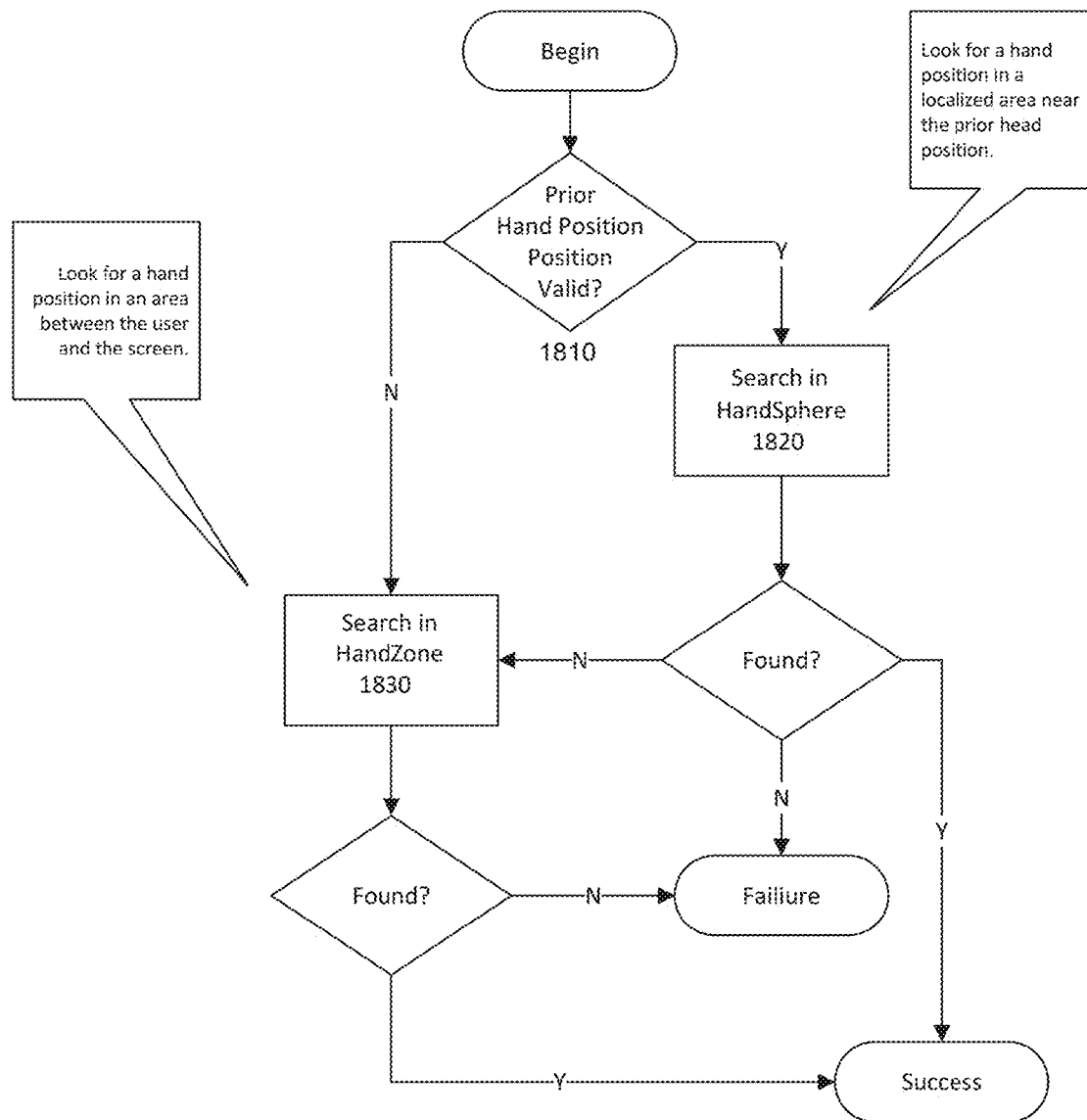

FIG. 18 diagrammatically illustrates an exemplary embodiment of a hand finder.

Figure 19:
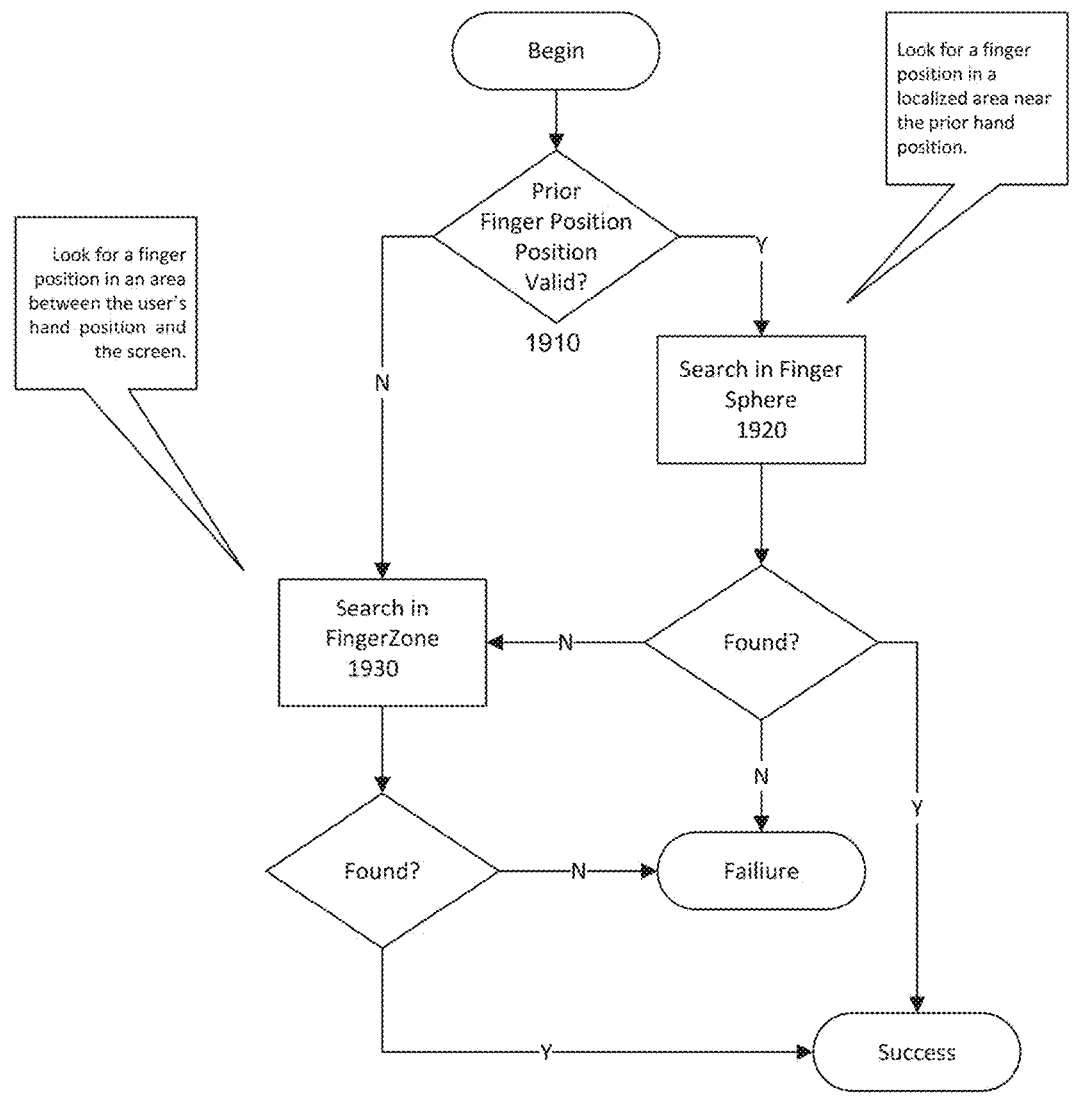

FIG. 19 diagrammatically illustrates an exemplary embodiment of a finger finder.

Figure 20:
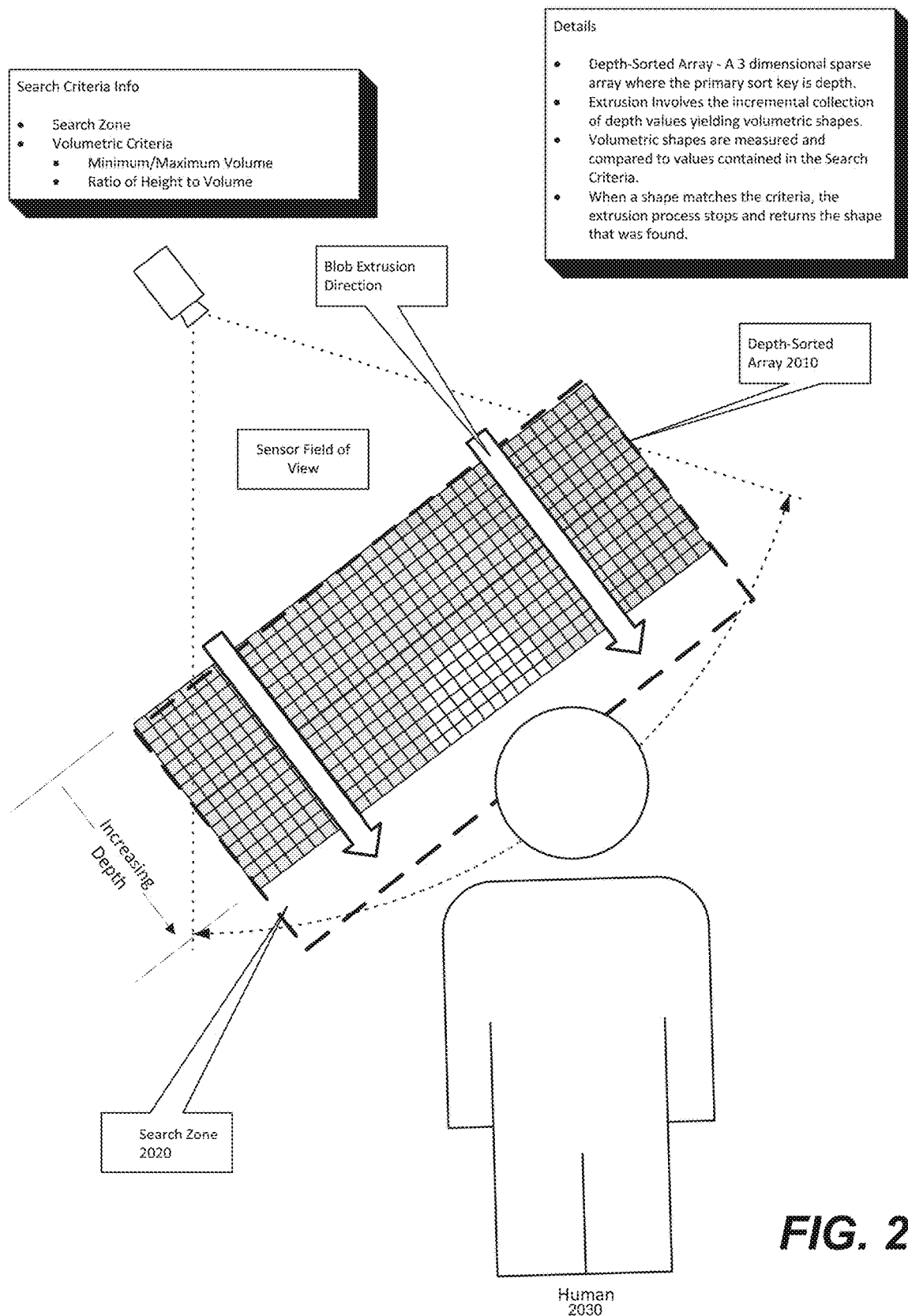

FIG. 20 diagrammatically illustrates an exemplary method for a shape-determining algorithm, or "blob finder".

Figure 21:
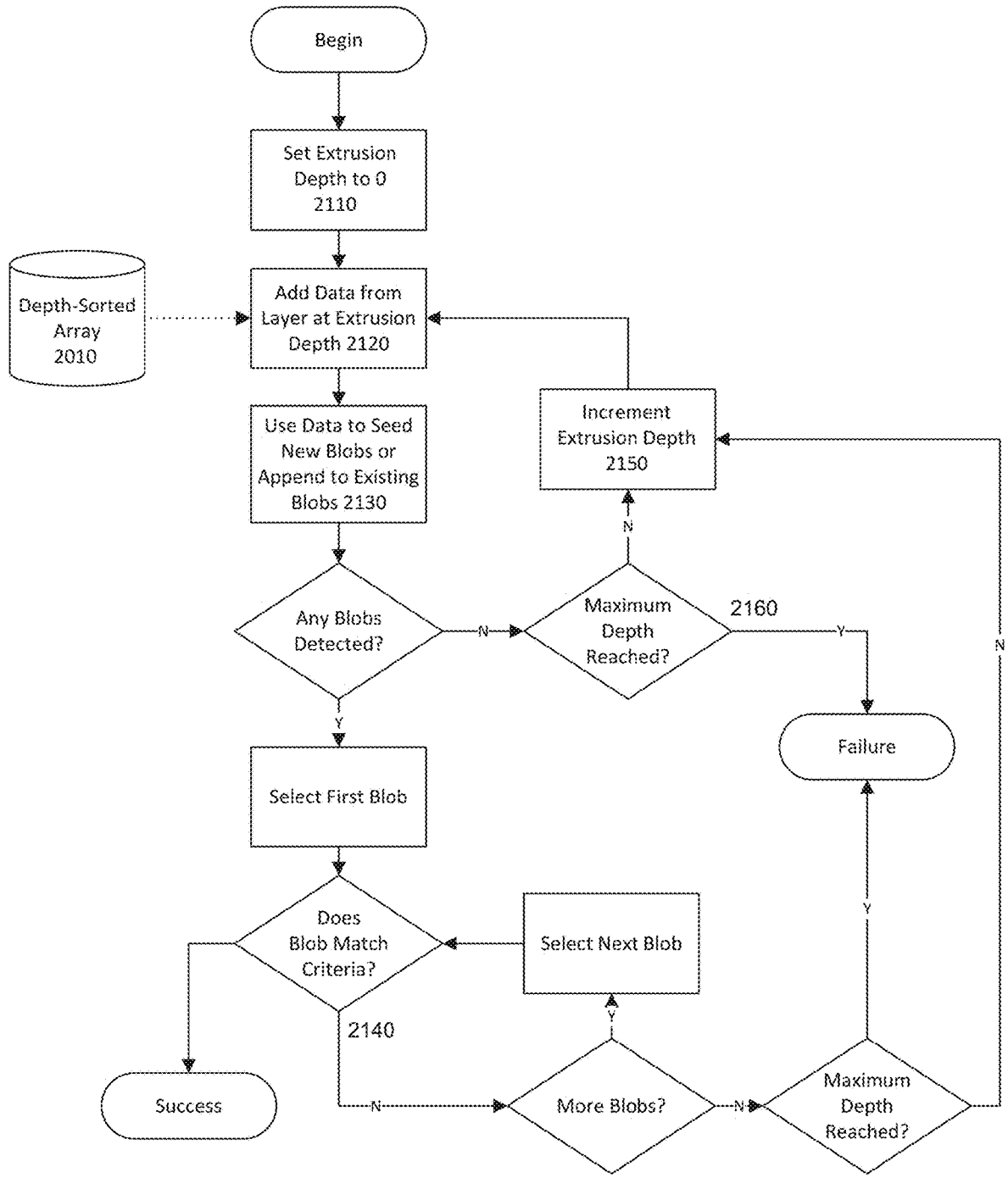

FIG. 21 diagrammatically illustrates an exemplary algorithm for a blob finder.

Figure 22:
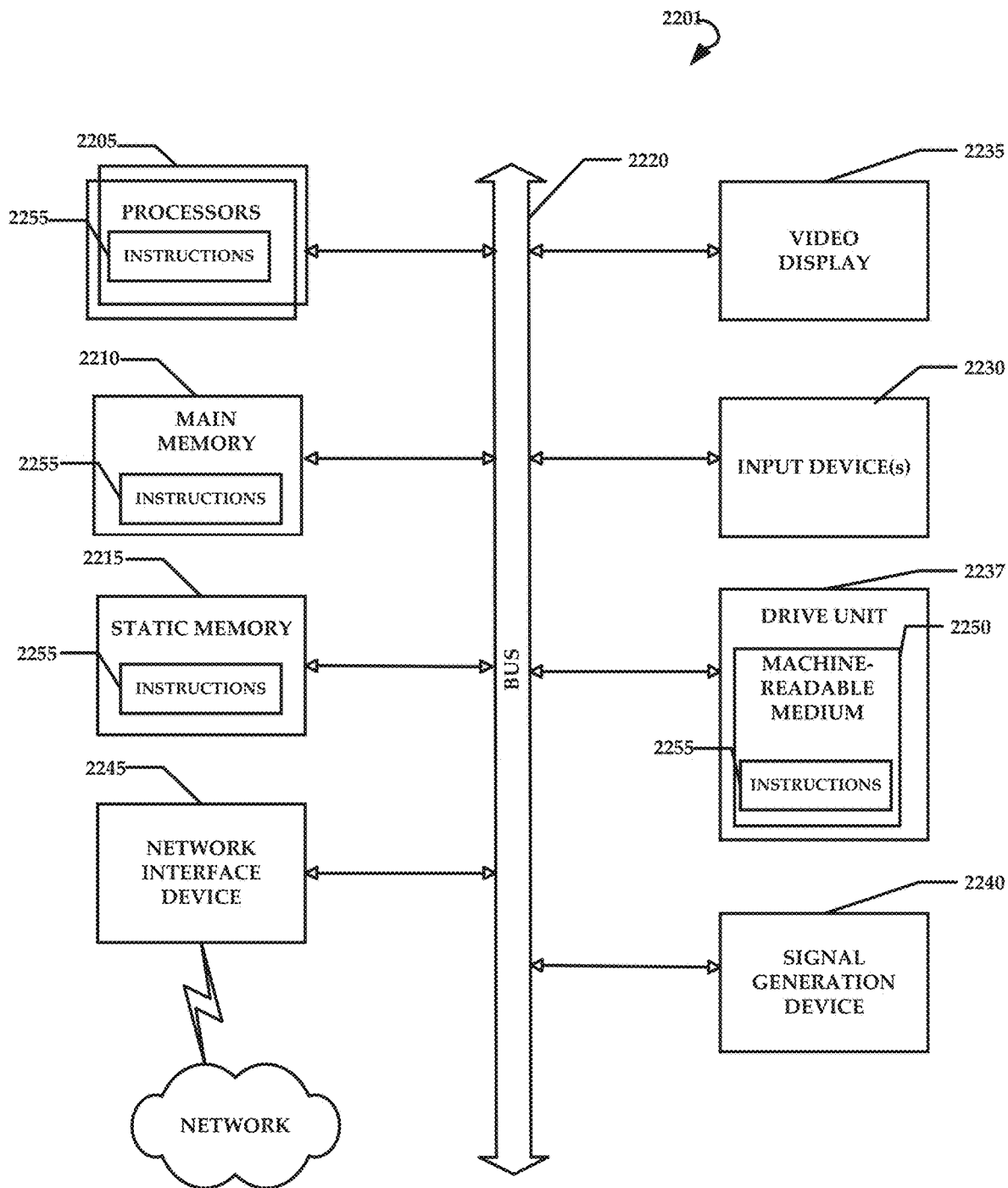

FIG. 22 diagrammatically represents an example machine in the form of a computer system within which a set of instructions for causing the machine to perform any one or more of the methodologies discussed herein may be executed.

DETAILED DESCRIPTION

The approaches described in this section could be pursued but are not necessarily approaches that have previously been conceived or pursued. Therefore, unless otherwise indicated, it should not be assumed that any of the approaches described in this section qualify as prior art merely by virtue of their inclusion.

Visual display technology has continuously improved over time, allowing for mass production and consumption of very high-quality displays at relatively affordable prices. These high-quality displays have been integrated into every aspect of consumers' lives, whether at a miniaturized level with phones, tablets and laptops or larger sizes with monitor displays and television sets. However, one thing that has continuously been difficult to integrate into day-to-day display devices is a true three-dimensional viewing experience. While three-dimensional television sets have been produced, they utilize traditional stereoscopic technology which requires the use of special 3D glasses, making the experience inconvenient and less attractive to users. Moreover, traditional 3D viewing generally uses two streams of video images, one for the left eye, the other for the right eye. Both streams are rendered from a single fixed perspective.

There are other solutions that integrate the idea of a three-dimensional viewing experience, the first being virtual reality (VR) technology, where the user wears a device such as a VR headset that immerses the user inside a three-dimensional world. However, wearing a headset is cumbersome and requires expensive equipment including very powerful hardware devices in addition to the headpiece, such as very powerful computing devices and graphical processing units (GPU). Furthermore, it does not allow for the integration of the physical space inhabited by the wearer and his or her surroundings in the virtual world. Augmented reality (AR) technology allows for the integration of a virtual image or video on top of physical space and the physical environment. However, all AR does is place a virtual object, for example a virtual car—which may or may not be moving—on top of a physical environment, such as an empty parking space. Usually, the camera of a phone is used, and the car is displayed on the screen. Headsets may also be employed. AR technology does not respond to the user's position relative to virtual space or the display screen. For example, if the user moves laterally, but the phone he or she is using to display the virtual image remains pointed at the parking space, the objects displayed on the screen remain static. AR does not shift perspective of what is displayed based on what the user is looking at or how the user's eyes or body are moving or directed towards. Furthermore, AR is based on a relationship between a display screen or device and an environment. What is presented in this document is a system where the relationship is between a user and his or her person and a virtual three-dimensional world.

The technologies presented herein are directed to systems and methods that provide a true three-dimensional viewing experience to interact with, and react to a user's position, directionality, perspective, actions, and/or movement. The present technology integrates the virtual world rendered and displayed on a display device with the physical space inhabited by the user and other objects in their physical space. The PopScreen solutions presented herein do not require a user to wear a headset, 3D glasses, carry a phone or other mobile device, have, or use any equipment on their person. The technology can also make use of and display scenes on any ordinary display device including and not limited to television sets, a monitor, a phone, laptop, or tablet device.

The PopScreen solutions presented herein are further differentiated from current two and three-dimensional viewing experiences in several ways. When displaying two-dimensional renderings of three-dimensional views, regardless of whether the view is a picture, video, game, drawings or otherwise, the renderings are displayed using 'perspective data' or information. This data includes, but is not limited to, the viewer's point in space relative to the content being viewed, the direction that the user is facing, and a field of view. In some embodiments, these are expressed as angles of width and height. In many embodiments, for media that is recorded and is being played to a user or observer, other factors are included in the perspective data or information, including but not limited to: the direction(s) that any camera(s) are facing, and the one or more camera's field of view of the user to help define the user or observer's position, direction, and field of view.

In some embodiments, dynamically generated media, such as games, utilize a 'virtual camera' that defines the field of view for the viewer, or a first-person perspective that is changeable by the user or the user's keyboard, mouse, controller or other equipment. Examples of a virtual camera that react to a user's actions include a virtual car driving forward, with the virtual camera moving forward into the three-dimensional scene. Alternatively, a zoom feature can be used where the user zooms in to a part of a rendered scene with a narrower field of view. The user can also move laterally to see behind virtual objects, or up or down to see over or under virtual objects; the user can move closer to the screen to expand their field of view; or they can move laterally to duck behind a virtual wall.

In comparison to traditional two-dimensional and three-dimensional viewing experiences, either displaying recorded or dynamic media, and where additional 3D glasses may be necessary to generate the experience, the PopScreen solutions presented herein present and display both two-dimensional and three-dimensional scenes of recorded or dynamically generated media. The viewing experience and perspective display updates and renders new three-dimensional perspectives based on changes to the user's position and other "perspective data" that can be collected. The user's position may take on an unlimited number of different perspectives, angles, and positions. Furthermore, the PopScreen solution does not require the use of 3D glasses but provides the option for their use if a user wants to enhance the depth of the viewing experience.

In various embodiments the systems and methods for the display of three-dimensional scenes with changing perspectives ("PopScreen Solution") include one or more visual sensors, including but not limited to three-dimensional sensors, three-dimensional depth sensors or cameras, digital or web cameras, infrared cameras and the like. The visual sensors are used to detect people, or other objects, movements, angles, directionality, or distance. Various embodiments also employ one or more display devices such as a monitor or television set. Other display devices may also be used including and not limited to mobile devices such as laptops, phones, or tablets. Various embodiments also utilize one or more computing devices to carry out underlying computations to run the methods described herein, including processing data, conducting computations and analysis, and rendering scenes to be displayed. Other devices may also be incorporated or be part of the systems and methods described herein, including input and output devices such as speakers and microphones.

In several embodiments the PopScreen solutions described establish, set, and utilize a three-dimensional coordinate space and map the space on top of physical space. In preferred embodiments, the positive and negative coordinate space of both the x-axis and y-axis of this three-dimensional space are set to exist solely within the virtual world or virtual space. The virtual space exists on, and can be rendered on, a display device. In some embodiments, the z-axis is divided between the physical space occupied by a user or observer of the system and the virtual space rendered on the display device. The positive coordinates of the z-axis occupy physical space, and the negative coordinates of the z-axis occupy the virtual space within the display device, although alternative embodiments are enabled where the positive and negative axes are reversed. It should further be noted that while preferred embodiments use cartesian coordinates (x, y, z), alternative coordinate systems may be used as well, including cylindrical (r, θ, z) or spherical (θ, φ, z) coordinate systems.

In preferred embodiments, the point of origin (or 0 coordinate) of the z-axis is located on the surface of the screen of the display device, such that everything behind the screen is set along the negative coordinates of the z-axis and everything in front of the screen is in the physical world with the user and is along the positive z-axis coordinates. However, in several embodiments, virtual objects also exist in the positive z-axis coordinates in physical space. For example, a virtual ball moving in the negative z-axis coordinates, existing solely within the display device, may bounce against a wall in the virtual space into the positive z-axis coordinates that exist in the physical space with the user, and may in turn bounce against a user or object back into the negative z-axis coordinates in the virtual space or virtual world. In various embodiments, this three-dimensional coordinate space is a 1:1 match with a user's coordinate system, allowing exact matching and 1:1 sizing between the virtual and physical worlds. For example, in embodiments using 1:1 sizing, a cup that is 70 millimeters high in the real world will appear to be 70 millimeters high in the virtual world. Such dimensional alignment helps the user envision objects in their true size and as they would appear if placed in the physical space.

In many embodiments, one or more sensor devices capture image data as point cloud data from the physical space occupied by a user. The different data points within the point cloud are then sorted based on their position on the z-axis, such as their coordinates on the z-axis determining their distance from the one or more sensor devices or one or more display devices. The image data is corrected, and noise and outliers are removed from the point cloud data set. After determining the different distances of the different remaining datapoints, any datapoints that are closely associated to each other are then used to build a model or shape of a certain volume. A foreground and background are also determined. The models and shapes are further refined to produce more clearly defined shapes with set height and width characteristics. Once these shapes are defined, they are then compared with pre-set or pre-defined parameters of "target objects", and the shapes are then matched with the closest parameter or parameters. The shapes are then assigned the value of the closest parameter, which designates the object to equal the pre-set parameter and defines the shape as a specific target object. These target objects defined by the pre-set parameters either exemplify or characterize certain inanimate objects or body parts, as well as positions or configurations of these objects or body parts and provide certain value ranges into which objects or body parts fall. For example, a pre-defined parameter defines a certain body part, such as the shape of a hand, nose, the structure of a face, eyes, or body parts in a certain position, a head turned sideways, a palm facing upwards, a palm facing the sensor, or one parameter for a left hand and another parameter for a right hand. Other parameters may be associated with inanimate objects such as a lamp, a table, or a chair. In many embodiments, once objects are found that match the pre-set parameters, other objects that are not target objects are then removed from the dataset. The only remaining objects that the PopScreen solution earmarks are other target objects which are used by the system to further compute the user's position, viewing angle, perspective or direction, or their actions, or that are otherwise important.

In some embodiments, the one or more sensor devices sense the position and strength of actual lights in the user's room. Such embodiments allow the system to adjust the display based on the strength of the lighting in the physical space. Physical light sources in the room can project onto the physical space scene to provide perspective-relative shadows. Alternatively, a user can alter the lighting in the virtual space using a control device, vocal command, or gesture-based command, such as reaching for a light source in the virtual space. Applications using 3D sound technology further enable the system to place virtual sound sources where they would be expected in the virtual scene.

In some embodiments, a user's hands are able to interact with virtual objects. In these embodiments temporal filtering or averaging is employed to provide higher precision for identifying a hand, such as distinguishing between left or right hand, and the gestures the hand is making. Furthermore, in some embodiments, the position of a hand is determined by calculating the position of a target object on the three-dimensional coordinate space relative to the position of the head.

Several embodiments use the location, position, and size of target objects that are a certain body part, such as a head or eyes pointing towards a certain direction, or a hand making a gesture or specific movements, to present a particular perspective of a scene on the display device. In various embodiments, if the system detects a head, face, or eyes, it then establishes a frustum, a three-dimensional shape which originates from the source of a user's point of view and encapsulates and contains their field of vision, providing the system with a calculated width of a field of view that shifts along with the user's movement, direction, and estimated point of view. This frustum provides a sense of depth and a basis for changing perspectives, rendering a particular perspective of a scene based on several factors that contribute to the frustum, including the position, viewing angle, and direction of the user or specific body parts, with the scene changing based on changes in the calculated frustum. When a user moves in three-dimensional space, the frustum adjusts accordingly. A frustum may be of various geometric shapes.

In various embodiments, the field of view provided by the frustum is recalculated as the user moves or changes direction. After the system has detected and determined the target objects and has removed all other objects from image data, the system continuously updates the position and distance of these target objects and the associated frustum and produces new perspectives, scenes, or images to be shown by the display device. In many embodiments, several display options are possible. For example, a user moves toward a display device or screen, and thereby cause a displayed object or scene to be expanded or magnified. Alternatively, the user moves away from a device or screen and cause objects or a scene to be reduced in size. As an image or video increases or decreases in size, the number of corresponding pixels used by each portion of a video, scene, or image also increases or decreases accordingly. In some embodiments, as a user moves from side to side, or laterally, the user is enabled to peek behind objects presented in a scene. For example, a user may view objects hidden behind a building that is displayed on the screen by peering around the virtual building, such as by getting close to or moving to one side of the display device.

One example of how a frustum is utilized by the PopScreen solution is that when a video is shown to a user, the video can be set to show one specific viewing angle or perspective to the user, such as a centered profile view, no matter how the user moves. As the user moves position or changes the direction of their gaze, the frustum adjusts, and the video perspective displayed on the screen shifts as well to maintain displaying the centered profile view to the user. In various embodiments, the frustum is used to show different perspectives to a user based on the position, direction, and field of view of the user as determined by the frustum. This means that a user is presented with changing perspectives of a scene as the user moves laterally, diagonally, toward, or away from, or any other way in 3-space in relation to the screen or display device.

In several embodiments a user interacts with the scenes displayed by the display device. In some such embodiments, the user directly interacts with virtual objects mapped on the positive z-axis coordinate space, where the positive z-axis represents physical space. Such interaction can be made using objects the user is holding, or the user's hands or other designated body parts. Movement occurs when a user's hand grasps or touches an object, using a grasping gesture or object-defined stickiness. A release gesture is likewise used to release the object. Virtual objects appearing in the positive z-axis are thus translated from one position to another. A user's hand can also change the velocity of an object via collision dynamics.

Virtual objects mapped on the negative z-axis coordinate space, by their nature, can only be interacted with by indirect or projected interaction. Preferred embodiments implement projected interaction using a specialized 3D cursor designed for interaction in the virtual coordinate space. The display device presents virtual objects mapped on the physical space (positive z-axis coordinate space) differently to those mapped on the virtual space (negative z-axis coordinate space) to allow the user to differentiate between objects mapped in different spaces. In some embodiments, the 3D cursor appears to be in a position proximate to the user, such as hovering directly above a user's hand. An arrow cursor or gloved hand is used in some embodiments to depict the 3D cursor on the display. Alternatively, or in conjunction, a 3D surface is used to represent the cursor. In some embodiments, the cursor is affected by the user's position in the physical space, becoming larger as the user approaches the screen or smaller as the user moves away, or taking on lighting and shading characteristics of the physical space. Interactions with objects with a 3D cursor include but are not limited to selecting, rotating, enlarging, reducing, tapping, translating, moving, spinning, and throwing displayed objects.

Preferred embodiments define a vector to implement the 3D cursor, such as a positional relationship between the user's eyes and hands. The vector projects in a direction into the screen, through the virtual world, thereby defining a line of sight or series of line-of-sight positions in the 3D space. In these and further embodiments, object selection is made by placing the 3D cursor near, or centered over, an object in the 3D space. Gestures or commands, such as a single "tap", are used to select the object. Subsequent clicks are used for further actions, such as listing tools or possible actions. Some embodiments deploy a physics engine to ensure that virtual objects move and react realistically to force and collisions. Traditional physics engines have objects overlap with each other before triggering a collision animation, which is a reactive and inefficient approach. In preferred embodiments, each object has mass, and a certain velocity when moving. The PopScreen Solution therefore calculates the time until the next collision between objects. Based on that calculated time, the collision and its accompanying animation on the display device is executed, which in turn triggers another elapsed time calculation to collision between objects in a continuing cycle. One example is a collision between a user's hand and a virtual ball object. The user's hand, as a 'target object' is assigned an estimated mass value, and the ball is assigned a predetermined mass value. As the hand approaches the ball, calculations occur to estimate time elapsed until collision, and the animated collision occurs based on this time calculation.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

FIG. 1 presents one embodiment of the system configuration for the PopScreen Solution system 100 described in this document. In this embodiment a monitor or other display device 110 is connected to a computing device 120 through a monitor input 150. A 3D depth sensor 130 to capture image data is connected to the computing device through a sensor output 140. The image data is rasterized and used to determine positions of a user and user portions or objects relative to the position of the monitor or other display device 110.

FIG. 2 presents a side orthographic view 210 and a top orthographic view 220 of the coordinate space utilized by the PopScreen solution. The x, y, and z axes of the coordinate space are shown relative to a user and a virtual object. The positive and negative coordinate spaces of the z-axis are separated by a monitor or other display device 110.

FIG. 3 presents a perspective view of the coordinate space 300 utilized by PopScreen solution. The mapping of the x, y and z axes on virtual and physical spaces is shown.

FIG. 4 presents a top-down view of one embodiment of a coordinate space containing a user 410, physical objects 420 and virtual objects 430 in the coordinate space utilized by the PopScreen solution. The positive and negative coordinate spaces of the z-axis are separated by a monitor or other display device 110.

FIG. 5 presents a top-down view of one embodiment of the systems and methods described where the user's field of vision 510, as defined by a frustum emanating from the user's eye position, determines what is displayed by the PopScreen solution. Virtual object 507 exists in the physical space positive z-axis coordinates, and virtual objects 501, 503 and 506 that exist in the virtual space negative z-axis coordinates are all viewable by the user, fall within his or her field of vision 510, and are rendered on a monitor or other display device 110. Virtual objects 502, 504 and 505 fall outside of the user's field of vision 510 and will not be displayed.

FIG. 6 presents a top-down view of one embodiment of the PopScreen solution where the changes in the user's position change what is displayed by the system. The movement of a user dictates what they can see and what is rendered on the display device. In the user's prior position 610, the user initially can see objects 607, 601, 603 and 606.

but the user then moves, and in the new position 620 the user now sees virtual objects 602, 604, 605 and 606 displayed on the screen of the monitor or other display device 110. The objects that are no longer seen by the user (or displayed on the screen) still exist in the virtual world and can be seen again by the user if he or she changes their position or viewing angle.

FIG. 7 presents another top-down view example of an embodiment of the PopScreen solution where changes in the user's position change what is displayed by the system. In an initial position 710, a user can see a large virtual object 730. But as a user moves to a second position 720, he or she can now see a second virtual object 740, which was previously hidden from the user's view by the large virtual object 730 when the user was in their initial position 710. Changes in the user's position thereby allow previously hidden virtual objects to be revealed.

FIG. 8 presents a top-down example of one embodiment of the PopScreen solution where changes in the user's position expand the user's field of view. The display screen acts similar to a window, and like looking through a window, when a user is further away from the window (or display device in this case), his or her field of vision is limited, blocked by wall (the edge of the display device), but when a user gets closer to a window, the user's field of vision broadens and expands and the user can see more objects. In FIG. 8, the user is in an initial position 810 farther away from the screen than their subsequent position 820. In the initial position 810, only virtual objects B and C are within the user's field of vision. However, as the user approaches the subsequent position 820, the user's field of vision expands, and virtual objects A and D are brought into frame.

FIG. 9 presents a diagram of a user in three-dimensional space 900. A user can move in any direction in three-dimensional space with the PopScreen solution. Each new position represents a unique viewing perspective.

FIG. 10 presents a diagram comparing traditional stereoscopic viewing to the PopScreen solution. Stereoscopic technology uses separate video streams generated from a pair of fixed positions 1010 and requires 3D glasses to unite the streams 1020 to provide a 3D experience. Generally, with this method, one point of view is delivered through 3D glasses to a user's left eye, while the other is delivered to the right eye. What a user can see is independent of the user's position relative to the screen or display device, as the video streams are rendered from the same fixed positions from which they were captured. As such, the left and right points of view are predetermined and not affected by the user's movements.

FIG. 11 presents another diagram comparing traditional stereoscopic viewing to the PopScreen solution. The PopScreen solution allows viewing through either a stereoscopic mode where users can wear 3D glasses to enhance depth perception, or a monoscopic mode without any 3D glasses. In both modes, the position of a user, their angle and gaze direction determines the perspective of, and what is rendered on the display device to the user. Each viewing location has a different perspective into the virtual 3D space. For example, as depicted in FIG. 11, the right eye will have a slightly different viewing perspective than the left eye 1100.

FIG. 12 presents a diagram of different possible perspectives of a model of a van displayed by the PopScreen solution. As a user moves relative to the screen, they see a different perspective of the van based on their viewing position and angle.

FIG. 13 presents a diagram of one embodiment of a user manipulating the 3D cursor 1310. The 3D cursor 1310 is controlled with a user's hands and gestures and highlights objects over which it hovers. A vector 1320 from the user's eye position through the user's finger position is projected into the virtual 3D space until it intersects with a 3D object 1330. A vertical offset is applied to the vector so that the selected object is not obscured by the user's finger.

FIG. 14 presents a top-down view of one embodiment of possible actions using a 3D cursor with the PopScreen solution. In this embodiment the cursor has a pre-determined path it hovers over and roams on to select each virtual object. The user sweeps 1410 the cursor across view, whereby the cursor follows a contour 1420 that allows for selection of any 3D object.

FIG. 15 diagrammatically illustrates an overview of an exemplary method for anatomical tracking. One or more Point Cloud Capture Devices, or PCCDs 1505, receive point cloud input from the physical space and transmits the point cloud data to the system by one or more sensor interfaces 1510. In some embodiments, a stream consolidator 1515 is used, for example, when multiple PCCDs 1505 are used simultaneously. The stream consolidator 1515 combines point cloud data into a single point cloud having a single virtual sensor location. In some embodiments, a foreground detector 1520 determines a background value for each XY position in the collective field of view and removes these values from the consolidated point cloud.

In some embodiments, when sensors fail to produce a depth value for one or more points in the consolidated point cloud, a hole filler 1525 creates interpolated data for missing points. Such missing points may be the result of blind spots, or areas that are shielded from the view of the PCCDs 1505.

In some embodiments, a pre-extrusion sorter 1530 sorts values according to depth, producing a three-dimensional sparse array where the primary sort key is depth. Once the consolidated point cloud has been sorted, the sorted points are passed to an anatomical finder 1535, which determines anatomical positions of a user in the physical space. The anatomical positions are supplied to various other components in the overall system.

FIG. 16 diagrammatically illustrates an exemplary method implemented by an anatomical finder 1535. At the outset, the PCCDs 1505 scan the physical space and determine, based on pre-defined parameters and the sorted point cloud data, whether a user is in the space. A head finder 1605, again using pre-defined parameters, is used to determine the position of the head within the sorted point cloud data. The anatomical finder 1535 runs a "head position found" determination 1610 as to whether a head position has been found in the point cloud. If the head position has been found, the head position is added at step 1615 to a list of anatomical positions. The anatomical finder 1535 proceeds to determine the location of the hands using a hand finder 1620, again using pre-defined parameters applied to the sorted point cloud data. The anatomical finder runs a "hand finder" determination 1625 as to whether the hand position has been found. The hand may be found using body proportion ratios or extrapolated point cloud data. If the hand position has been found, the hand position is added at step 1630 to the list of anatomical positions. Using data from the hand position, the anatomical finder uses a finger finder 1635 to determine the position of the fingers within the sorted point cloud data. The anatomical finder runs a "hand finder" determination 1640 as to whether the fingers have been found. If the fingers have been found, the finger position is added at step 1645 to the list of anatomical positions.

In the exemplary embodiment of FIG. 16, it should be noted that if any of the head, hand, or finger positions are not found, the method terminates. After termination, the method begins again, although some embodiments are configurable to proceed with one determination or more of the head, hand, and finger positions.

FIG. 17 diagrammatically illustrates an exemplary embodiment of a head finder 1605. The head finder determines an initial or prior head position 1710 from the point cloud data. If the head position is determined, a region of configurable radius, centered about the user's prior head position, is established. In some embodiments, this region is called the "HeadSphere". A cuboid area close to the screen is also established, referred to in some embodiments as the "EntryZone". If the prior head position is in the EntryZone, the head finder 1605 searches the HeadSphere 1720 for a new head position. The head finder 1605 searches the HeadSphere to continuously update movements of the user's head. If the user's head is not found in the HeadSphere or a prior position is not recognized, the head finder 1605 conducts a search of the EntryZone 1730.

In some embodiments, the system informs a user that the head is not found in the EntryZone and recommends transitioning to a position 1740 within the EntryZone.

FIG. 18 diagrammatically illustrates an exemplary embodiment of a hand finder 1620. At the outset, an initial hand position, or prior hand position 1810, is determined. The system determines a cuboid area between the user's head position and the screen in which the hand is recognized. In some embodiments, this cuboid region is called the HandZone. The system further establishes a sphere of configurable radius centered at a user's prior hand position, which in some embodiments is called the HandSphere. If the prior hand position is valid, or recognized within the HandZone, the system conducts a search of the HandSphere 1820 for the new position. If the prior hand position is not recognized, the system conducts a search of the HandZone 1830. If the user's hand position is not determined from the HandZone or HandSphere, the process starts again.

FIG. 19 diagrammatically illustrates an exemplary embodiment of a finger finder 1635. The finger finder 1635 operates similarly to the hand finder 1620. At the outset, a user's initial finger position, or prior finger position 1910, is determined. The system determines an area between the user's hand position and the screen. In some embodiments, this area is called the FingerZone. The system further determines a sphere of configurable radius centered at the user's prior finger position, which, in some embodiments, is called the FingerSphere. If the prior finger position is valid, or recognized within the FingerZone, the system conducts a search of the FingerSphere 1920 for the new position. If the prior finger position is not recognized, the system conducts a search of the FingerZone 1930. If the user's finger position is not determined from the FingerZone or FingerSphere, the process starts again.

FIG. 20 diagrammatically illustrates an exemplary method for a shape-determining algorithm, or "blob finder". The blob finder receives a depth-sorted array 2010 of point cloud data representing a three-dimensional space, where the primary sort key for the point cloud data is depth. The blob finder uses extrusion, whereby incremental collection of depth values yields volumetric shapes. The volumetric shapes are measured and compared to values contained in search criteria, which includes the search zone 2020 and volumetric criteria, such as minimum or maximum values and ratios such as height to volume. When a shape matches the criteria, such as a user matching criteria for human 2030, the extrusion process stops and the system returns to the shape that was found.

FIG. 21 diagrammatically illustrates an exemplary algorithm for a blob finder. The extrusion depth is initialized to zero 2110, after which data is added from a layer at an extrusion depth 2120. This data is used to seed new blobs or append to existing blobs 2130. Once a blob is detected, the blob is evaluated to see whether is matches pre-set criteria 2140, such as the shape of a human being or human head. If the shape matches, the algorithm is complete. If the shape does not match pre-set criteria, the algorithm continues to detect new blobs by incrementing extrusion depth 2150 until a maximum depth is reached 2160, such as the maximum depth of the physical space, at which point the algorithm terminates and the process begins again.

FIG. 22 is a diagrammatic representation of an example machine in the form of a computer system 2201, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2201 includes a processor or multiple processor(s) 2205 (e.g., a central processing unit (CPU), a graphics processing unit (GPU), or both), and a main memory 2210 and static memory 2215, which communicate with each other via a bus 2220. The computer system 2201 may further include a video display 2235 (e.g., a liquid crystal display (LCD)). The computer system 2201 may also include an alpha-numeric input device(s) 2230 (e.g., a keyboard), a cursor control device (e.g., a mouse), a voice recognition or biometric verification unit (not shown), a drive unit 2237 (also referred to as disk drive unit), a signal generation device 2240 (e.g., a speaker), and a network interface device 2245. The computer system 2201 may further include a data encryption module (not shown) to encrypt data.

The disk drive unit 2237 includes a computer or machine-readable medium 2250 on which is stored one or more sets of instructions and data structures (e.g., instructions 2255) embodying or utilizing any one or more of the methodologies or functions described herein. The instructions 2255 may also reside, completely or at least partially, within the main memory 2210 and/or within the processor(s) 2205 during execution thereof by the computer system 2201. The main memory 2210 and the processor(s) 2205 may also constitute machine-readable media.

The instructions 2255 may further be transmitted or received over a network via the network interface device 2245 utilizing any one of several well-known transfer protocols (e.g., Hyper Text Transfer Protocol (HTTP)). While the machine-readable medium 2250 is shown in an example embodiment to be a single medium, the term "computer-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A method for generating a three-dimensional scene based on a user's perspective, the method comprising:
    mapping a three-dimensional space, the mapping comprising demarcating an axis of the three-dimensional space at its origin at a surface of a display device, whereby one side of the axis is mapped onto a physical space inhabited by a user;
    receiving, by one or more sensor devices, point cloud data from the physical space, the point cloud data being indicative of one or more target objects in the physical space;
    determining a coordinate position of a plurality of captured data points from the point cloud data;
    computing a likely shape for each of the one or more target objects based on the coordinate position of the plurality of captured data points;
    comparing the likely shape of the one or more target objects to one or more pre-defined parameters with pre-set values;
    assigning the pre-set values of the one or more pre-defined parameters to at least one of the one or more target objects;
    calculating a frustum based on at least one of the one or more target objects; and
    displaying, by the display device, a perspective of a three-dimensional virtual scene, the perspective being determined from the calculated frustum.

2. The method of claim 1, wherein the one or more target objects include one or more of: a human head, human eyes, a human hand, or other human body part.

3. The method of claim 1, wherein a position of a first object of the one or more target objects is determined by calculating a position of a second object as a target object relative in physical space to the position of the first object.

4. The method of claim 1, wherein captured data points that are not determined to be part of the one or more target objects are discarded.

5. The method of claim 1, further comprising continuously updating a set of the captured data points by continuously capturing position data and distance data of the one or more target objects and the calculated frustum.

6. The method of claim 5, further comprising producing a new scene, perspective, or image on the display device based on the continuously captured position data and the distance data.

7. The method of claim 1, further comprising showing, by the display device, a centered profile view, the centered profile view being fixed with respect to movement of the user.

8. The method of claim 1, further comprising generating and displaying a three-dimensional cursor in the three-dimensional virtual scene.

9. The method of claim 1, further comprising deploying a physics engine, the physics engine determining a mass, a position, and a velocity of one or more virtual objects in the three-dimensional virtual scene, calculating a time until a collision between the one or more virtual objects based on the mass, the position, and the velocity, and triggering an animation of the collision based on the time as calculated.

10. A system for generating a three-dimensional scene based on a user's perspective, the system comprising:
    at least one computing device having a memory and a processor, the computing device communicatively coupled with one or more display devices and one or more sensor devices, the memory storing instructions which when executed by the processor perform the steps of a method comprising:

mapping a three-dimensional space, the mapping comprising demarcating an axis of the three-dimensional space at its origin at a surface of the one or more display devices, whereby one side of the axis is mapped onto a physical space inhabited by a user;

receiving, by the one or more sensor devices, point cloud data from the physical space, the point cloud data being indicative of one or more target objects in the physical space;

determining a coordinate position of a plurality of captured data points from the point cloud data;

computing a likely shape for each of the one or more target objects based on the coordinate position of the plurality of captured data points;

comparing the likely shape of the one or more target objects to one or more pre-defined parameters with pre-set values;

assigning the pre-set values of the one or more pre-defined parameters to at least one of the one or more target objects;

calculating a frustum based on at least one of the one or more target objects; and displaying, by the one or more display devices, a perspective of a three-dimensional virtual scene, the perspective being determined from the calculated frustum.

11. The system of claim 10, wherein the one or more target objects include one or more of: a human head, human eyes, a human hand, or other human body part.

12. The system of claim 10, wherein a position of a first object of the one or more target objects is determined by calculating a position of a second object as a target object relative in physical space to the position of the first object.

13. The system of claim 10, wherein captured data points that are not determined to be part of the one or more target objects are discarded.

14. The system of claim 10, wherein the method further comprises continuously updating a set of the captured data points by continuously capturing position data and distance data of the one or more target objects and the calculated frustum.

15. The system of claim 14, wherein the method further comprises producing a new scene, perspective, or image on the one or more display devices based on the continuously captured position data and the distance data.

16. The system of claim 10, wherein the method further comprises showing, by the one or more display devices, a centered profile view, the centered profile view being fixed with respect to movement of the user.

17. The system of claim 10, wherein the method further comprises generating and displaying a three-dimensional cursor in the three-dimensional virtual scene.

18. The system of claim 10, wherein the method further comprises deploying a physics engine, the physics engine determining a mass, a position, and a velocity of one or more virtual objects in the three-dimensional virtual scene, calculating a time until a collision between the one or more virtual objects based on the mass, the position, and the velocity, and triggering an animation of the collision based on the time as calculated.

19. A non-transitory computer-readable storage medium having embodied thereon instructions which, when executed by a processor, perform the steps of a method for generating a three-dimensional scene based on a user's perspective, the method comprising:

mapping a three-dimensional space, the mapping comprising demarcating an axis of the three-dimensional space at its origin at a surface of a display device, whereby one side of the axis is mapped onto a physical space inhabited by a user;

receiving, by one or more sensor devices, point cloud data from the physical space, the point cloud data being indicative of one or more target objects in the physical space;

determining a coordinate position of a plurality of captured data points from the point cloud data;

computing a likely shape for each of the one or more target objects based on the coordinate position of the plurality of captured data points;

comparing the likely shape of the one or more target objects to one or more pre-defined parameters with pre-set values;

assigning the pre-set values of the one or more pre-defined parameters to at least one of the one or more target objects;

calculating a frustum based on at least one of the one or more target objects; and displaying, by the display device, a perspective of a three-dimensional virtual scene, the perspective being determined from the calculated frustum.

20. The non-transitory computer-readable storage medium of claim 19, wherein the one or more target objects include one or more of: a human head, human eyes, a human hand, or other human body part.

* * * * *